United States Patent [19]

Cusack et al.

[11] Patent Number: 6,071,114
[45] Date of Patent: Jun. 6, 2000

[54] METHOD AND APPARATUS FOR CHARACTERIZING A COMBUSTION FLAME

[75] Inventors: Deidre E. Cusack, Groton, Mass.; Leo Jubinville, Raymond; Jonathan Plimpton, Canterbury, both of N.H.

[73] Assignee: Meggitt Avionics, Inc., Manchester, N.H.

[21] Appl. No.: 08/985,836

[22] Filed: Dec. 5, 1997

Related U.S. Application Data

[63] Continuation of application No. 08/666,042, Jun. 19, 1996, Pat. No. 5,828,797.

[51] Int. Cl.$^7$ ..................................................... F23N 5/08
[52] U.S. Cl. ............................... 431/79; 431/75; 431/12; 431/76; 60/39.03; 340/578
[58] Field of Search .................................. 431/12, 79, 76, 431/75; 340/578; 60/39.03

[56] References Cited

U.S. PATENT DOCUMENTS

| | | |
|---|---|---|
| 3,080,708 | 3/1963 | Carr . |
| 4,455,487 | 6/1984 | Wendt . |
| 4,830,601 | 5/1989 | Dahlander et al. ........................ 431/12 |
| 4,896,965 | 1/1990 | Goff et al. . |
| 5,303,684 | 4/1994 | Brown et al. . |
| 5,311,167 | 5/1994 | Plimpton et al. . |
| 5,467,185 | 11/1995 | Engeler et al. . |
| 5,480,298 | 1/1996 | Brown . |
| 5,487,266 | 1/1996 | Brown . |
| 5,612,676 | 3/1997 | Plimpton et al. . |
| 5,785,512 | 7/1998 | Cormier ..................... 431/79 |
| 5,828,797 | 10/1998 | Minott et al. ............... 385/12 |

FOREIGN PATENT DOCUMENTS

| | | | |
|---|---|---|---|
| 4025808 | 1/1991 | Germany ................................. 431/79 |
| 4025909 | 7/1991 | Germany ................................. 431/79 |
| 1138022 | 6/1986 | Japan ..................................... 431/79 |
| 240027 | 10/1986 | Japan ..................................... 431/79 |

OTHER PUBLICATIONS

Janos M. Beer, et al., Individual Burner Air/Fuel Ratio Control Optical Adaptive Feedback Control System, Jan. 19 1982, pp. 1–62 and Appendix A–1 to A–8 (No date).

Silicon Carbide Ultraviolet Photodetector Chip 1mm×1 mm Die Size CD 260–1.00–D, CREE Research Inc. (No date).

Thin Film Thermopile Detectors, Jul. 22, 1996 Meggitt Avionics Inc. ABB Stal launch GTX100 at 43 MW with dual fuel DLE capability, May/Jun. 1997.

International Turbomachinery A New Member of the ABB High–Performance Gas Turbine Family, ABB Stal Ab.

James A. Harrington, Crystalline and Hollow Infrared Fiber Optics, Fiber Optic Materials Research Program, Rutgers University, NJ (No date).

Y. Matsuura et al., Optical propreties of small–bore hollow glass waveguides, Oct. 20, 1995, pp. 6842–6846, Applied Optics.

C.C. Gregory et al., Attenuation, modal, and polarization roperties of no←1, hollow dielectric waveguides, Sep. 20, 1993, pp. 5302–5309, Applied Optics.

James A. Harrington et al., Hollow sapphire fibers for the delivery of $CO_2$ laser energy, 1990, pp. 541–543, Optical Society of America.

Rick K. Nubling et al., Optical properties of single–cyrstal sapphire fibers, pp. 1–30, Fiber Optic Materials Research Program, Rutgers University, Piscataway, NJ (No date).

Dale M. Brown et al., SiC Flame Sensors for Gas Turbine Control Systems, pp. X–23 to X–28 (No date).

WO,92010705, DAS, Flame Detector, Jun. 1992.

*Primary Examiner*—Carl D. Price
*Attorney, Agent, or Firm*—Wolf, Greenfield & Sacks, P.C.

[57] ABSTRACT

Characteristics of a flame within a turbine or burner are determined based upon ultraviolet, visible, and infrared measurements of the flame. The measurements include the amplitude of frequency bands that are indicative of an efficient combustion process, such as those that increase when the flame temperature increases. The measurements also include the amplitude of frequency bands that are indicative of an inefficient combustion process, such as those that do not vary, increase a relatively small amount, or decrease when the flame temperature increases. The temperature of the flame may therefore be determined accurately, to facilitate efficient operation of the turbine or burner, while minimizing polluting emissions.

24 Claims, 17 Drawing Sheets

METHOD AND APPARATUS FOR CHARACTERIZING A COMBUSTION FLAME

RELATED APPLICATIONS

This application is a continuation of application Ser. No. 08/666,042, filed Jun. 19, 1996, entitled "Fiber Optic Linked Flame Sensor" with the named inventors, George Minott and Jonathan Plimpton and which issued as U.S. Pat. No. 5,828,797 on Oct. 27, 1998.

BACKGROUND

1. Field of the Invention

This invention relates generally to turbine and burner control, and more particularly to characterizing a combustion flame within a turbine or burner to facilitate control of the turbine or burner.

2. Discussion of the Related Art

Turbines and burners are used to produce power from gas fuel and liquid fuel. Generally, turbines are characterized as power-producing devices that operate at a high internal pressure, while burners operate at atmospheric pressure.

FIG. 1 depicts a turbine system for producing power. Although a turbine system is described herein, the concepts are equally applicable to burner systems, and therefore it should be understood that the term "turbine" as used in this disclosure also refers to burners.

FIG. 1 shows a turbine 10 coupled to a turbine controller 11. The turbine 10 receives air 22 via air inlet 12, receives fuel 23 via fuel inlet 13, generates power 24 at power output 14, and emits exhaust 25 at exhaust outlet 15. Typically, the exhaust outlet 15 is coupled to an input 26 of an exhaust stack 27. The exhaust stack 27 may include additional inputs 28 that receive exhaust 29 from other turbines. An air flow probe 16 is coupled to the air inlet 12 and also coupled to the turbine controller 11. Additionally, a fuel flow probe 17 is coupled to the fuel inlet 13 and also coupled to the turbine controller 11. Although the air flow probe 16 and fuel flow probe 17 are each depicted in FIG. 1 as being external to the turbine 10, either or both may instead be disposed internal to the turbine 10 or anywhere along the respective path of air flow or fuel flow. The turbine system may further include a pressure probe 18 and a number of external thermocouples 19, each of which is coupled to both the turbine 10 and turbine controller 11. External thermocouples 19 typically provide temperature measurements of the fuel 23, exhaust 25, turbine surface, and the like.

In operation, the turbine controller 11 receives from the turbine sensors (e.g., air flow probe 16, fuel flow probe 17, pressure probe 18, and external thermocouples 19), and provides control signals 42 to control the operation of the turbine 10 according to a desired operating mode. Examples of control signals 30 include signals that control injectors within the turbine, signals that control the amount of fuel input to the turbine 10, signals that control an air/fuel ratio within the turbine, and other control signals as known in the art.

On Nov. 15, 1990, the Clean Air Act Amendments of 1990 (CAA) were enacted (Public Law 101-549, 104 Stat. 2399, codified at 42 U.S.C. 7401-7671q. The second phase of the Clean Air Act requires that every industrial facility be controlled to emanate less than a predetermined amount of Nitrogen Oxide Compounds (NOx). The air quality planning requirements for the reduction of NOx emissions through reasonably available control technology (RACT) are set out in section 182(f) of the CAA, which is incorporated by reference in its entirety.

On Nov. 25, 1992, the EPA published "State Implementation Plans; Nitrogen Oxides Supplement to the General Preamble; Clean Air Act Amendments of 1990 Implementation of Title I; Proposed Rule," (The NOx Supplement) which describes and provides preliminary guidance on the requirements of 182(f), and is also incorporated by reference in its entirety. Such requirements present a particular challenge to owners and operators of combustion turbines and burners. To meet the requirements of the Clean Air Act, it is necessary to determine the NOx content of the exhaust. Typically, compliance with the Clean Air Act is determined by measuring the content of exhaust that passes through an industrial plant's exhaust stack. If the measurement indicates too much of any chemical, it is generally necessary to take additional steps to achieve compliance with the Clean Air Act. For example, the exhaust stack may be modified to increase the height at which it emanates. Alternatively or in combination, post-exhaust devices may be added to reduce the pollution content of the exhaust. These devices typically add to the operating and maintenance cost of the industrial plant. If the requirements of the Clean Air Act cannot be met by any of these approaches, the Clean Air Act includes a provision by which an industrial plant may purchase or otherwise obtain the right to emanate at a higher rate than other organizations.

Generally, however, it is desirable to control the contributing turbines or burners to operate more efficiently. One manner in which to improve the operating efficiency is to operate the turbine or burner at an optimized combustion flame temperature. In such a manner, an industrial plant may meet the requirements of the Clean Air Act, reduce pollution, and increase the overall efficiency of the turbine or burner, for example by reducing operating costs by reducing the amount of fuel utilized.

Many industrial facilities include an exhaust stack that passes the combined exhaust from several turbines and burners. In such cases it is difficult to determine the flame quality of any one of the contributing turbines and burners because the several exhausts have been combined and passed through the exhaust stack. Thus, the characteristics of the combined exhaust cannot be easily attributed to any particular contributing turbine or burner.

Additionally, even in an arrangement in which a single exhaust stack is used for a single turbine or burner, measurements made at the exhaust stack are generally unsuitable for feedback control of the turbine or burner because of the delay in feedback and the poor accuracy of such measurements.

A temperature probe may be positioned close to the exhaust from each turbine to provide an approximate indication of the combustion flame temperature. However, such an arrangement is quite susceptible to leakage into or out of the exhaust path which will in turn affect the quality of any measurement made by such a probe. Furthermore, the combustion flame temperature must be back calculated in such an arrangement, which often yields a temperature characterization of questionable accuracy.

Moreover, some turbine systems include a plurality of burners that share a single exhaust. For example, the GTX100 gas turbine, available from ABB STAL AB of Finspong Sweden, includes a plurality of individual combustion burners that each contributes to a single exhaust diffuser. The exhaust diffuser is connectable to an exhaust stack or a waste heat recovery unit which may be controlled to further reduce emissions. However, any single measurement made at the exhaust diffuser represents only the aggregate performance of all of the plurality of individual combustion burners. In such an arrangement, it is difficult to determine individual burner flame quality based upon the single shared exhaust. This arrangement provides a particular challenge for individually tuning the performance of the individual combustion burners, or performing fault isolation on the individual combustion burners if it is suspected that one may have failed.

Direct measurement of combustion flame temperature is generally not implemented because most known thermocouples cannot survive the high temperature environment within the combustion chamber of a turbine. Moreover, the response time of known thermocouples is in the region of two seconds, which is usually longer than desirable for the purpose of the turbine controller providing control signals in a timely manner to efficiently control the turbine.

SUMMARY OF THE INVENTION

An embodiment of the invention characterizes a flame within a turbine or burner based upon ultraviolet, visible, and/or infrared measurements of the flame. Measurements are made of the amplitude of frequency bands that are indicative of an efficient combustion process, such as those that increase when the flame temperature increases. The measurement also include the amplitude of frequency bands that are indicative of an inefficient combustion process, such as those that do not vary, increase a relatively small amount, or decrease when the flame temperature increases. The temperature of the flame may therefore be determined accurately, to facilitate efficient operation of the turbine or burner while minimizing polluting emissions.

In accordance with another aspect of the invention, an optical fiber structure is provided which allows sensors and processing equipment to be located remotely from the turbine or burner under control. The optical fiber structure passes energy for several spectra by providing a hollow core that passes infrared energy, in combination with a core of visible-transmissive material that passes visible or ultraviolet energy.

One particular embodiment of the invention is directed to a system for characterizing a combustion flame, comprising a first sensor having an input that receives energy within a first frequency band indicative of an efficient combustion process, and an output that provides a first signal indicative of an amplitude of the energy within the first frequency band, a second sensor having an input that receives energy within a second frequency band indicative of an inefficient combustion process, and an output that provides a second signal indicative of an amplitude of the energy within the second frequency band, and a flame characterization module having a first input coupled to the output of the first sensor, a second input coupled to the output of the second sensor, and an output that provides a figure of merit that characterizes the combustion flame based upon the amplitude of energy within the first frequency band and the amplitude of energy within the second frequency band.

Another embodiment of the invention is directed to a method for characterizing a combustion flame, comprising the steps of measuring an amplitude of energy within a first frequency band indicative of an efficient combustion process, measuring an amplitude of energy within a second frequency band indicative of an inefficient combustion process, and determining a figure of merit to characterize the combustion flame based upon the amplitude of energy within the first frequency band and the amplitude of energy within the second frequency band.

Another embodiment of the invention is directed to an apparatus for characterizing a combustion flame, comprising first means for measuring an amplitude of energy within a first frequency band indicative of an efficient combustion process, second means for measuring an amplitude of energy within a second frequency band indicative of an inefficient combustion process, and third means for determining a figure of merit to characterize the combustion flame based upon the amplitude of energy within the first frequency band and the amplitude of energy within the second frequency band.

In any of the previous embodiments, the second frequency band may include a wavelength of 600 nm. Additionally, energy may be measured within a third frequency band within a visible region indicative of an efficient combustion process, and also measured within a fourth frequency band within an ultraviolet region indicative of an efficient combustion process. The first frequency band may be within an infrared region; and the figure of merit may be further based upon the amplitude of energy within the third frequency band and the amplitude of energy within the fourth frequency band.

Additionally, at least one characteristic of the combustion flame may increase in response to an increase in a temperature, while another characteristic of the flame may be indicative of at least one of soot and unburned hydrocarbons. The combustion flame may then be controlled based upon the figure of merit, which may also include a ratio between the first signal and the second signal.

Moreover, the figure of merit may be based upon a frequency of amplitude variation of one of the signals, or based upon an amount of AC amplitude variation of one of the signals.

Another embodiment is directed to a method for passing energy from a plurality of frequency spectra in a single structure, comprising the steps of passing infrared energy through a hollow core of an optical fiber structure, and passing at least one of visible energy and ultraviolet through transmissive material that surrounds the hollow core of the optical fiber structure.

Yet another embodiment is directed to an apparatus for passing energy from a plurality of frequency spectra in a single structure, comprising means for passing infrared energy through a hollow core of an optical fiber structure, and means for passing at least one of visible energy and ultraviolet through transmissive material that surrounds the hollow core of the optical fiber structure.

DETAILED DESCRIPTION

Figure 1:
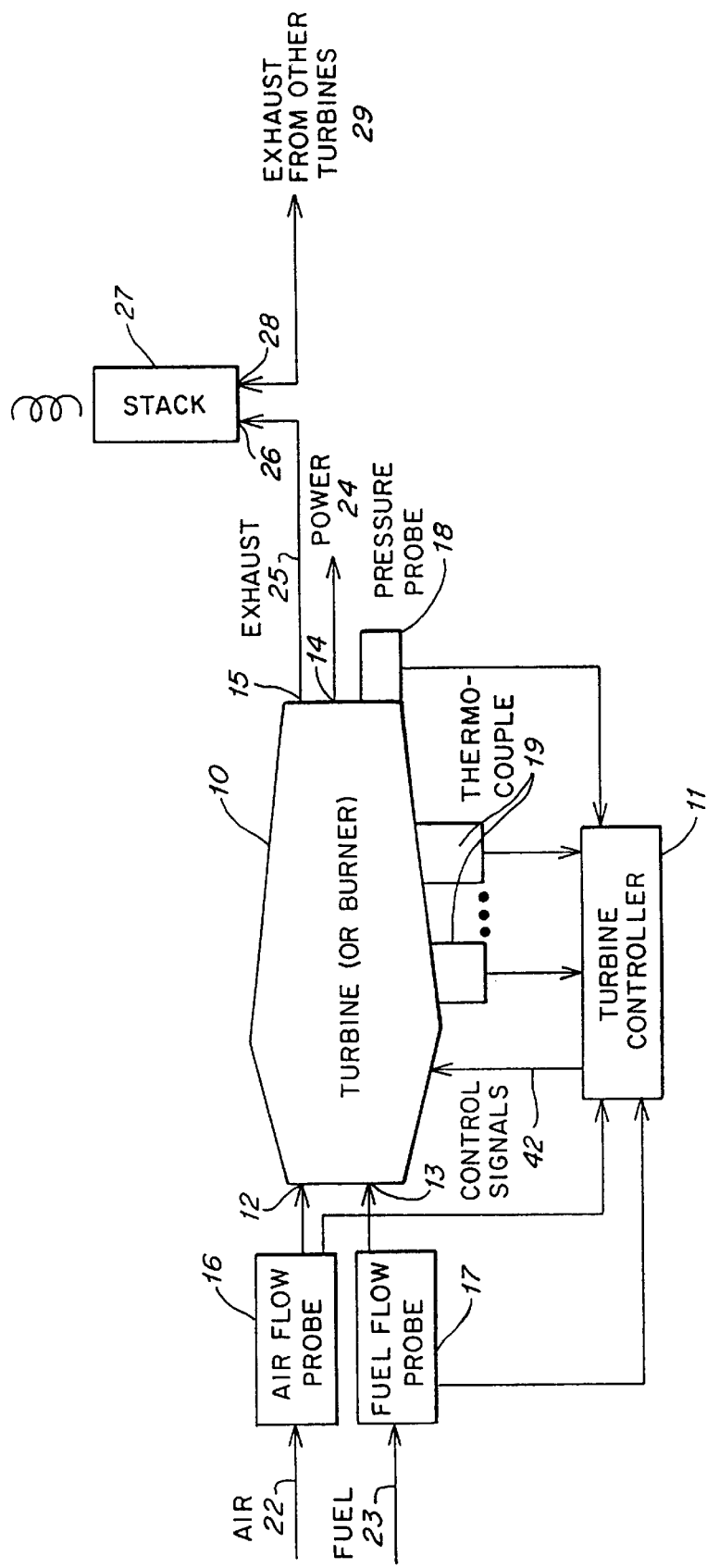
FIG. 1 is a block diagram of a turbine or burner system in which a turbine is controlled by a turbine controller.
Figure 2:
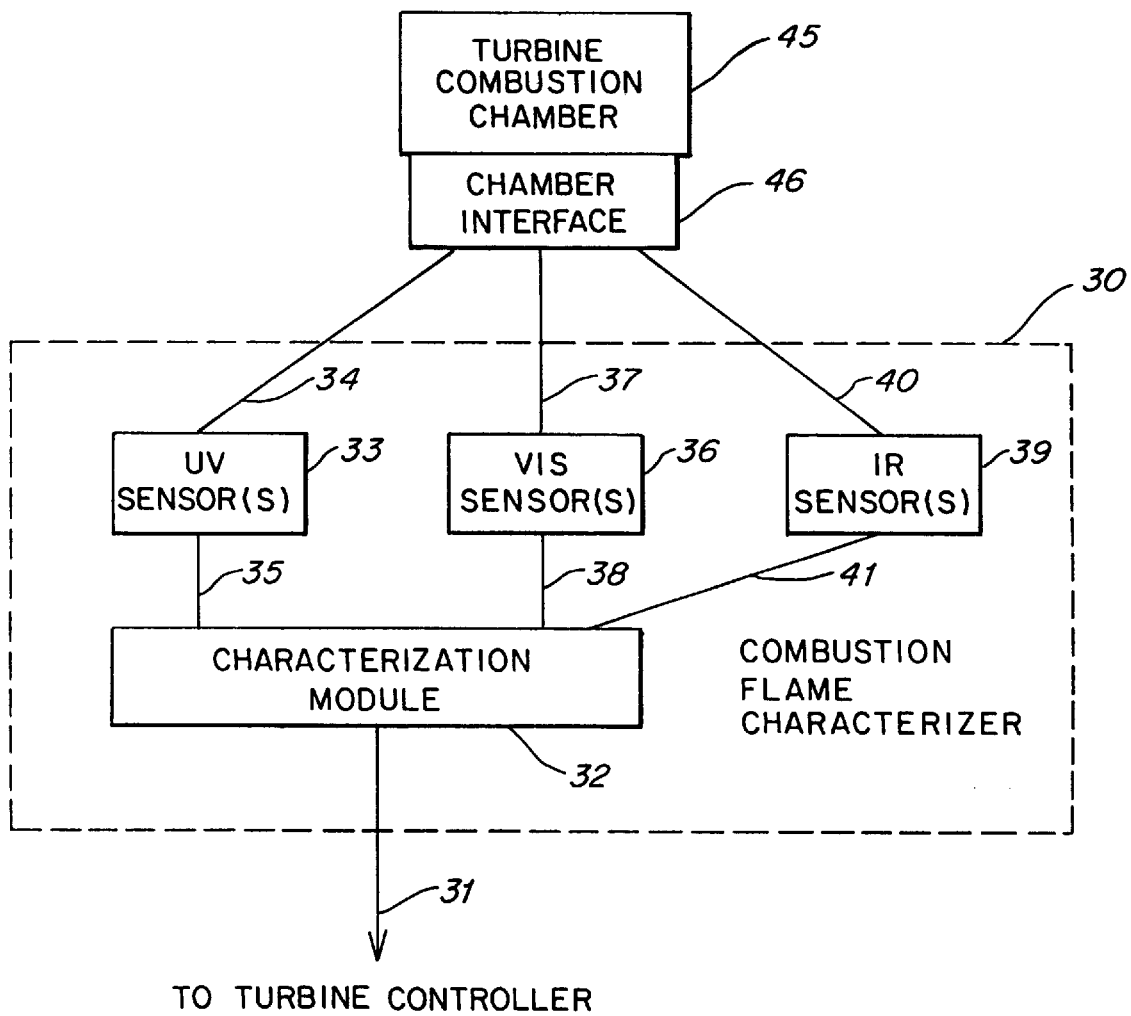
FIG. 2 is a block diagram of an embodiment of the invention including a combustion flame characterizer and sensors.

FIG. 2 depicts an aspect of the invention that facilitates control of a turbine by a turbine controller. In particular, FIG. 2 depicts one embodiment of a combustion flame characterizer 30 coupled to a turbine combustion chamber 45 and also to a turbine controller (not shown). The turbine controller to which characterizer 30 is coupled may be similar to the turbine controller 11 depicted in FIG. 1, but is constructed and arranged to receive the output 31 of characterizer 30 and to process data provided by output 31. The combustion flame characterizer 30 is coupled to the turbine combustion chamber 45 via a chamber interface 46, which may take any of several forms. In one embodiment chamber interface 46 is an optical port having high temperature and high pressure characteristics, disposed at the skin (outer surface) of the turbine. In another embodiment the chamber interface 46 includes a fuel injector port within the turbine combustion chamber 45.

Although industrial plant turbine systems are described herein, the concepts are also applicable to aerospace turbine control techniques such as, for example, control of jet engines. Additionally, although turbine control with respect to reduced emissions is disclosed, the concepts are also applicable to flameout detection and flashback detection. Flameout is a situation in which the flame within the turbine ceases to exist, and it is desirable to quickly cease fuel input, for example within 100 mS. Flashback is a situation in which the flame explodes or otherwise propagates backward, for example into a premix zone of a turbine, and should also be detected quickly.

As shown in FIG. 2, combustion flame characterizer 30 includes a characterization module 32 that provides the output directly or indirectly to the turbine controller. The characterizer 30 further includes: UV (ultraviolet) sensor(s) 33 having an input 34 coupled to the chamber interface 46 and an output 35 coupled to the characterization module 32; VIS (visible) sensor(s) 36 having an input 37 coupled to the chamber interface 46 and an output 38 coupled to the characterization module 32; and IR (infrared) sensor(s) 39 having an input 40 coupled to the chamber interface 46 and an output 41 coupled to the characterization module 32. The sensors 33, 36, 39 may be disposed directly at the chamber interface 46, or may be remotely positioned as discussed in more detail below.

In operation, the sensors 33, 36, and 39 provide frequency characteristics of a flame within the turbine combustion chamber 45 to the characterization module 32. The module 32 evaluates the frequency characteristics to provide particular flame characterizations to the turbine controller, in order to control the turbine. For example, since flame temperature is often related to the amount of NOx emissions, one approach is to determine a figure of merit that correlates to flame temperature based on the sensed frequency characteristics, so that the turbine controller can tune the various turbine controls to optimize flame temperature.

Figure 2A:
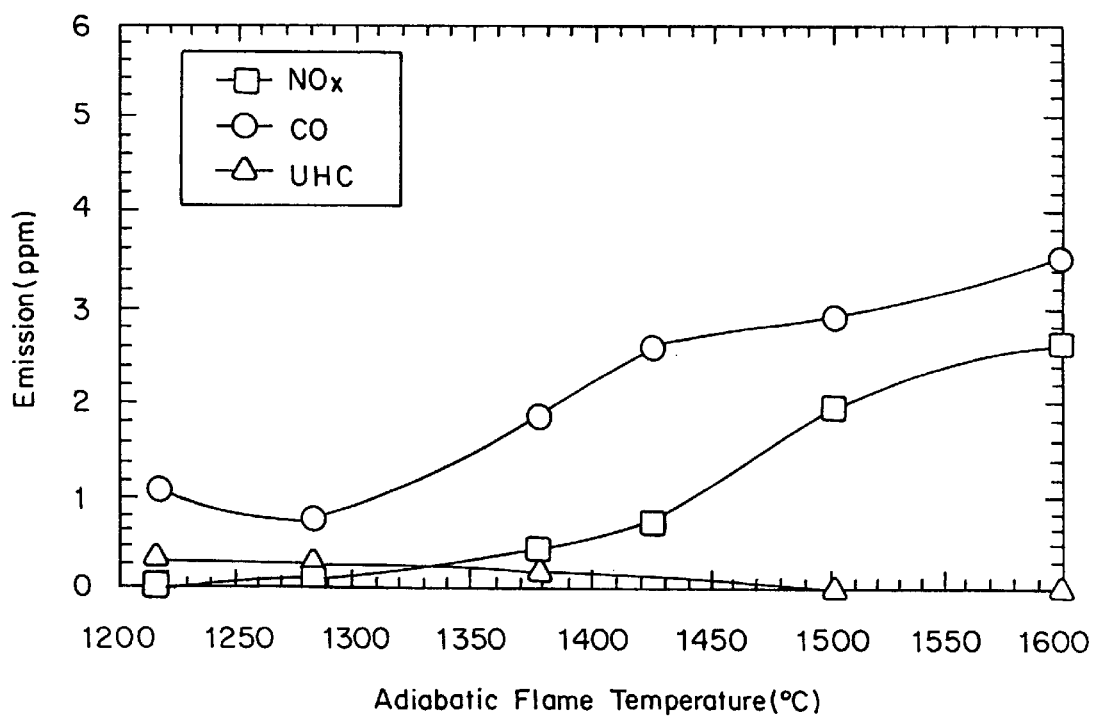
FIG. 2A is a graph showing the relationship in parts per million (ppm) of several pollutants as compared with flame temperature.

FIG. 2A is a graph showing the relationship in ppm (parts per million) of each of NOx, carbon monoxide (CO), and unburned hydrocarbons (UHC), as compared to the adiabatic flame temperature in degrees Celsius (° C.) of a Methane-burning turbine having an inlet temperature of 400° C. As seen from FIG. 2A, the amount of NOx generally increases with an increase in temperature, while the amount of CO has a minima at approximately 1275 degrees C., and the amount of UHC generally decreases with an increase in temperature. Generally, it is desirable to minimize the amount of each of NOx, CO, and UHC. However, it is important to optimize the flame temperature in a manner which does not significantly increase the risk of flameout and flashback, both of which are more likely in a flame of lower temperature in a lean burn mode of combustion.

Although maximizing flame temperature generally decreases the amount of NOx emissions, increased flame temperature may also increase maintenance costs because higher temperatures generally cause more failures of system components. Thus, it may also be advantageous to provide a figure of merit by which a particular flame temperature or range of flame temperatures can be achieved via the turbine controller.

The sensors 33, 36, and 39 are advantageously selected to measure desired flame characteristics. For example the sensors may include some frequency bands that vary predictably in response to a variation in flame temperature. Additionally, the sensors may sense some frequency bands that vary less than others, and some that are not indicative of any particular species. A more detailed discussion which may assist in the selection of frequency bands is disclosed by James M. Beer, Malcom T. Jacques, and J. Derek Teare in "Individual Burner Air/Fuel Ratio control Optical Adaptive Feedback Control System," (MIT Energy Laboratory Report No. MIT-EL 82-001), dated January 1982, which is hereby incorporated by reference in its entirety.

Several concepts relating to IR and UV detection are disclosed in U.S. Pat. No. 4,455,487, issued Jun. 19, 1984 to Roger A. Wendt, entitled "FIRE DETECTION SYSTEM WITH IR AND UV RATIO DETECTOR," which is hereby incorporated by reference in its entirety.

In accordance with one embodiment of the invention, seven different frequency bands are measured by the sensors 33, 36, and 39. The frequency bands, referred to herein by the name of the material represented by the associated wavelength, include a hydroxyl (OH) band, a CH band, an oxygen ($O_2$) band, a carbon dioxide ($CO_2$) band, a $H_2O$ and $CO_2$ band, an IR blackbody band, and a visible blackbody band. A description of each follows.

In general, there are several spectral regions that are indicative of efficient combustion, such as those representative of OH, CH, $O_2$, $CO_2$, and $H_2O$ and $CO_2$, which are generally referred to as species indicators since they are indicative of the presence of a particular species. Conversely, there are several spectral regions associated with an inefficient combustion process, such as those resulting from hot particulate matter such as soot and unburned hydrocarbons. The signals resulting from made of these regions, or others of similar nature, are combined and compared to characterize the quality of a combustion flame in a manner which has not been previously achieved.

Figure 3:
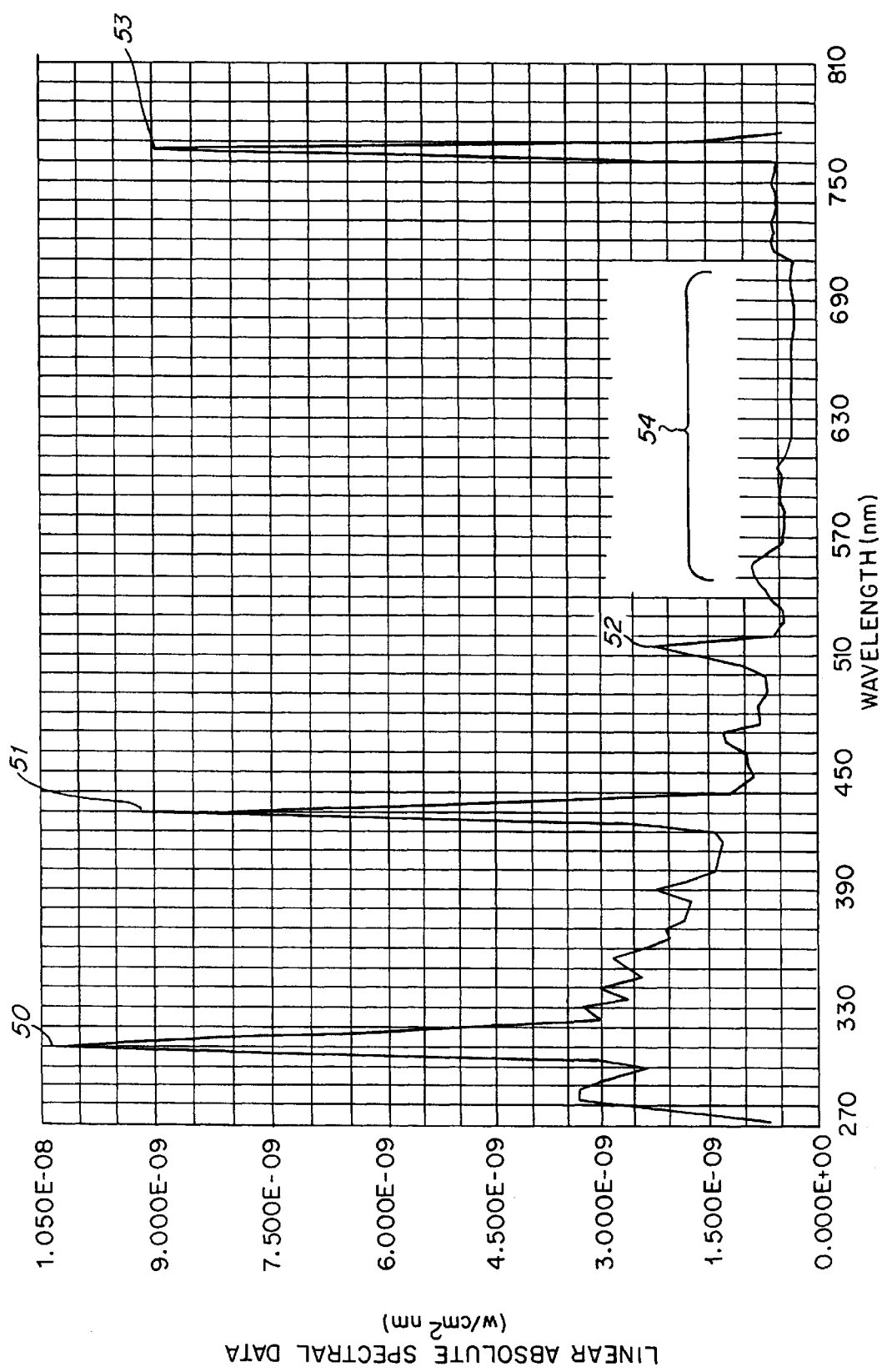
FIG. 3 is a graph showing ultraviolet and visible spectral data of a representative flame.

FIG. 3 depicts spectral data, generally within the ultraviolet (UV) and visible (VIS) regions, measured from the flame of a bunsen burner at a distance of approximately four inches, wherein the bunsen burner is in a lean burn condition. As can be seen from FIG. 3, there are several peaks of energy, including an OH peak 50 at a wavelength of approximately 310 nm (nanometers), a CH peak 51 at a wavelength of approximately 431 nm, a $C_2$ peak 52 at a wavelength of approximately 517 nm, and a $O_2$ peak 53 at a wavelength of approximately 760 nm. A large value from a measurement of any of the peaks 50–53 generally is indicative of an efficient combustion process, and has an amplitude that increases in response to an increase in the quality of the flame under measurement. Additionally, FIG. 3 depicts a visible blackbody region 54 corresponding approximately to a range of 550 nm to approximately 700 nm, the amplitude of which in general does not increase significantly in response to an increase in flame quality, or increases proportionally less than the amplitude for the species indicators.

Figure 4:
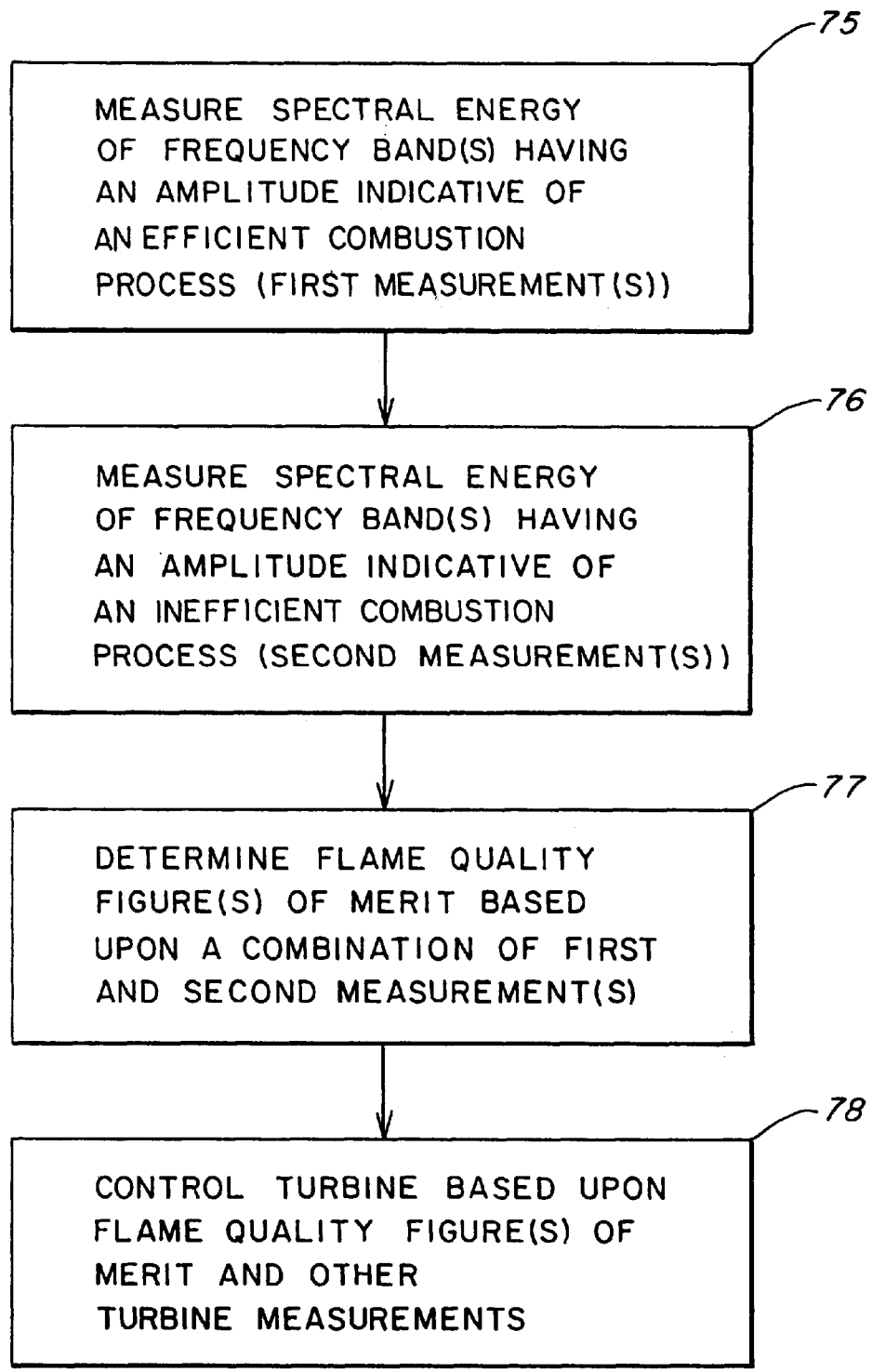
FIG. 4 is a process flow diagram showing steps of an exemplary process performed by the combustion flame characterizer of FIG. 2.

FIG. 4 is a process flow diagram in accordance with at least one embodiment of the invention. In step 75, the spectral energy of at least one frequency band is measured. This frequency band corresponds to an energy element that is indicative of an efficient combustion process. Typically, the related amplitude of this energy element increases with an increase in flame quality, often represented by flame temperature. In step 76, the spectral energy of at least one other frequency band is also measured, wherein the frequency band corresponds to an energy element that is indicative of an inefficient combustion process. Typically, the related amplitude of this energy element decreases or may stay relatively constant with an increase in flame quality, often represented by flame temperature.

In step 77, a flame quality figure of merit is determined based upon a combination of the measurement of step 75 and the measurement of step 76. One example of such a figure of merit is a ratio between the measurement of step 75 and the measurement of step 76. However, several combinations of such measurements may also be combined to determine one or more figure of merits, as will be described in more detail below. For example, two distinct measurements from step 75 could be combined and then compared with a measurement from step 76 to determine a ratio figure of merit. Additionally, for example, two or more different ratios could be combined to form a single figure of merit, or a plurality of figures of merit can be determined.

The timing of the process depicted in FIG. 4 depends generally upon the speed at which the turbine controller operates. An example of the sampling rate of a turbine controller is on the order of 120 mS (milliseconds). Thus, each figure of merit may be updated every 120 mS to support the control process in such an embodiment. Because the control algorithms for different turbine controllers may vary considerably, the figure(s) of merit may also vary considerably. For example, one turbine controller may be designed to be responsive to a percentage of change in flame temperature, which is an example of a figure of merit in accordance with one embodiment of the invention. Other turbine controllers may be designed to be responsive to direct or relative species variation, while others may be designed to be responsive to ratio variations, e.g., the percentage change in a ratio between OH and $CO_2$ or the percentage change in a ratio between OH and visible blackbody.

In step 78, the turbine under measurement is controlled based upon the flame quality figures of merit, as well as other measurements such as those described above with respect to FIG. 1. Examples of the other control inputs include input air flow, input fuel flow, various external thermocouple measurements, exhaust gas temperature measurements, and measurements from pressure probes. For example, a pressure transducer may be positioned on the output of the turbine to determine the overall load on the turbine, and this input is used to determine the control outputs.

The OH band is centered about a wavelength of approximately 310 nm, generally considered to be within the ultraviolet spectrum. Generally, the amount of energy within the OH band is indicative of an efficient combustion process. In response to an increase in flame temperature, the amplitude of the energy within the OH band increases, and therefore the amplitude of the OH band alone is indicative of flame temperature. In one embodiment the amplitude of a sensor measurement at the OH band is indicative of whether a flame exists at all.

Figure 5:
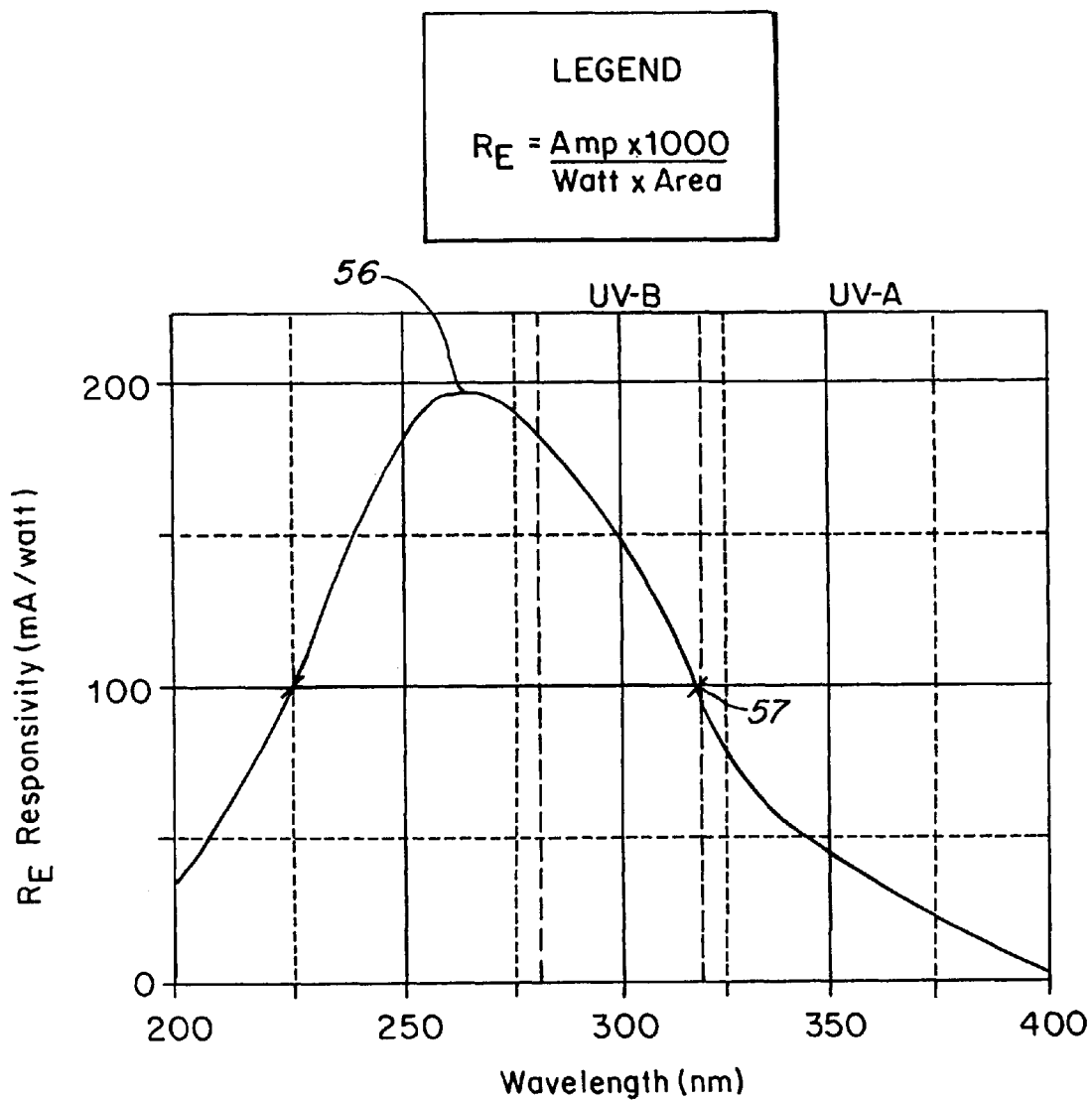
FIG. 5 is a frequency response graph of one of the sensors shown in FIG. 2.

One sensor for measuring the OH band includes a silicon carbide ultraviolet photo detector chip, such as part number CD-260-1.00-D, available from Cree Research, Inc., Durham N.C., USA 27713. The spectral response of such a device is depicted in FIG. 5. In particular, FIG. 5 depicts a peak 56 of responsivity (mA/W) (milliamps per watt) at approximately 270 nm, and a half-peak bandwidth 57 of approximately 95 nm, from a wavelength of approximately 225 nm to a wavelength of approximately 320 nm. This sensor, as well as other sensors described below, can be positioned at the chamber interface 46, or can be positioned remotely, with the sensed energy being transferred from the chamber interface 46 or from internal to the chamber to a remote location.

Additional discussion of Silicon Carbide (SiC) flame sensors, and in particular the relationship between flame temperature and the response of an SiC flame sensor, is provided by Dale Brown et al. In "SiC Flame Sensors for Gas Turbine Control Systems," GE Corporate Research and Development, which is incorporated by reference in its entirety.

Figure 6:
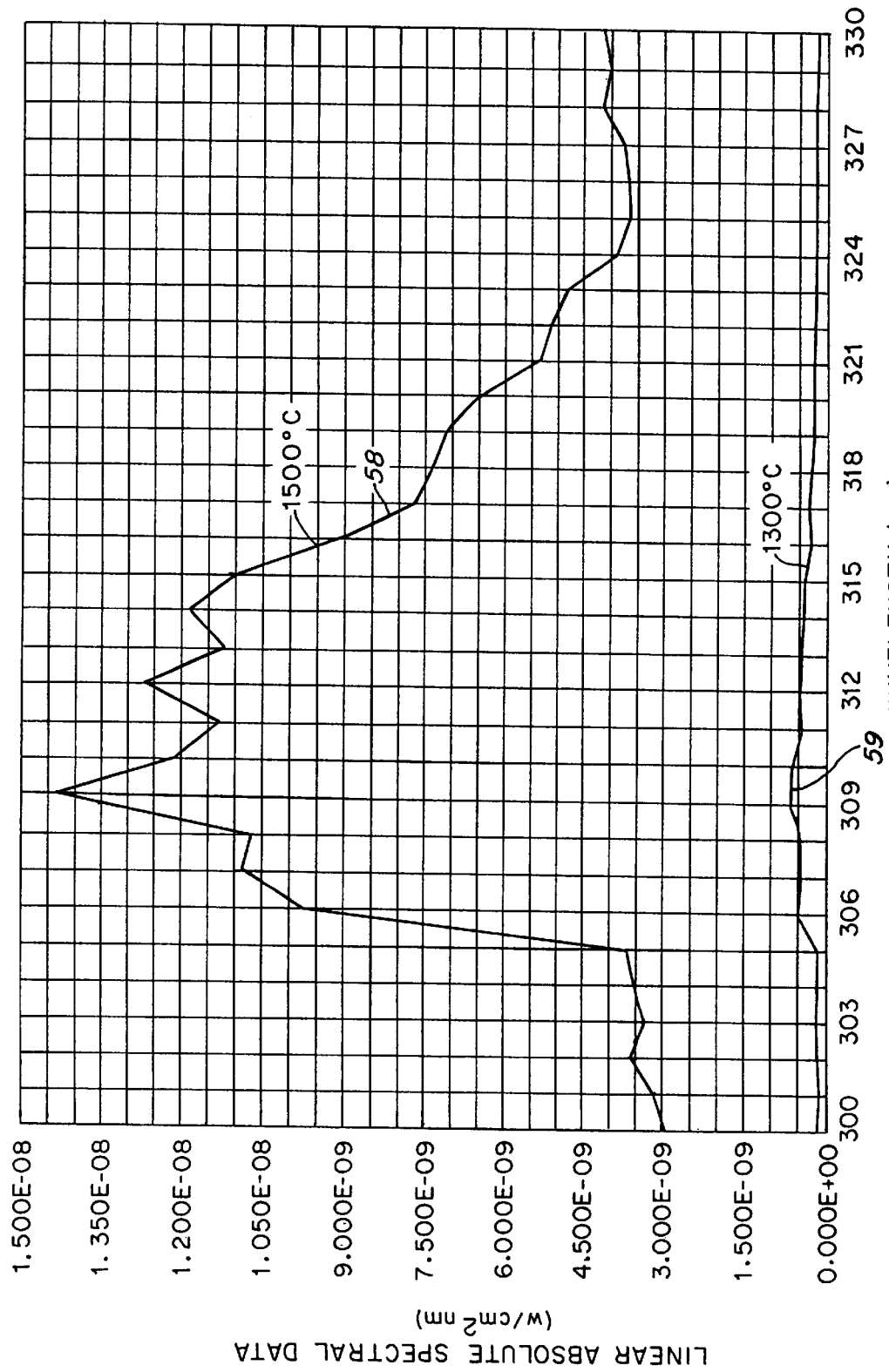
FIG. 6 is a frequency response graph showing a difference in frequency response of a flame at two different temperatures.

The CH band is centered about a wavelength of 430 nm, generally considered to be within the visible spectrum. Generally, the amount of energy within the CH band is indicative of an efficient combustion process. In response to an increase in flame temperature, the amplitude of the CH band increases. As an example of the dependence of the CH band amplitude compared with flame temperature, FIG. 6 depicts spectral data for the 310 nm region from two different flames, a higher temperature flame 58 at approximately 1500° C., and a lower temperature flame 59 at approximately 1300° C. As can be seen from FIG. 6, the peak of the CH band not only varies significantly with respect to flame temperature, but also varies more significantly than other regions directly adjacent the CH band.

Figure 7:
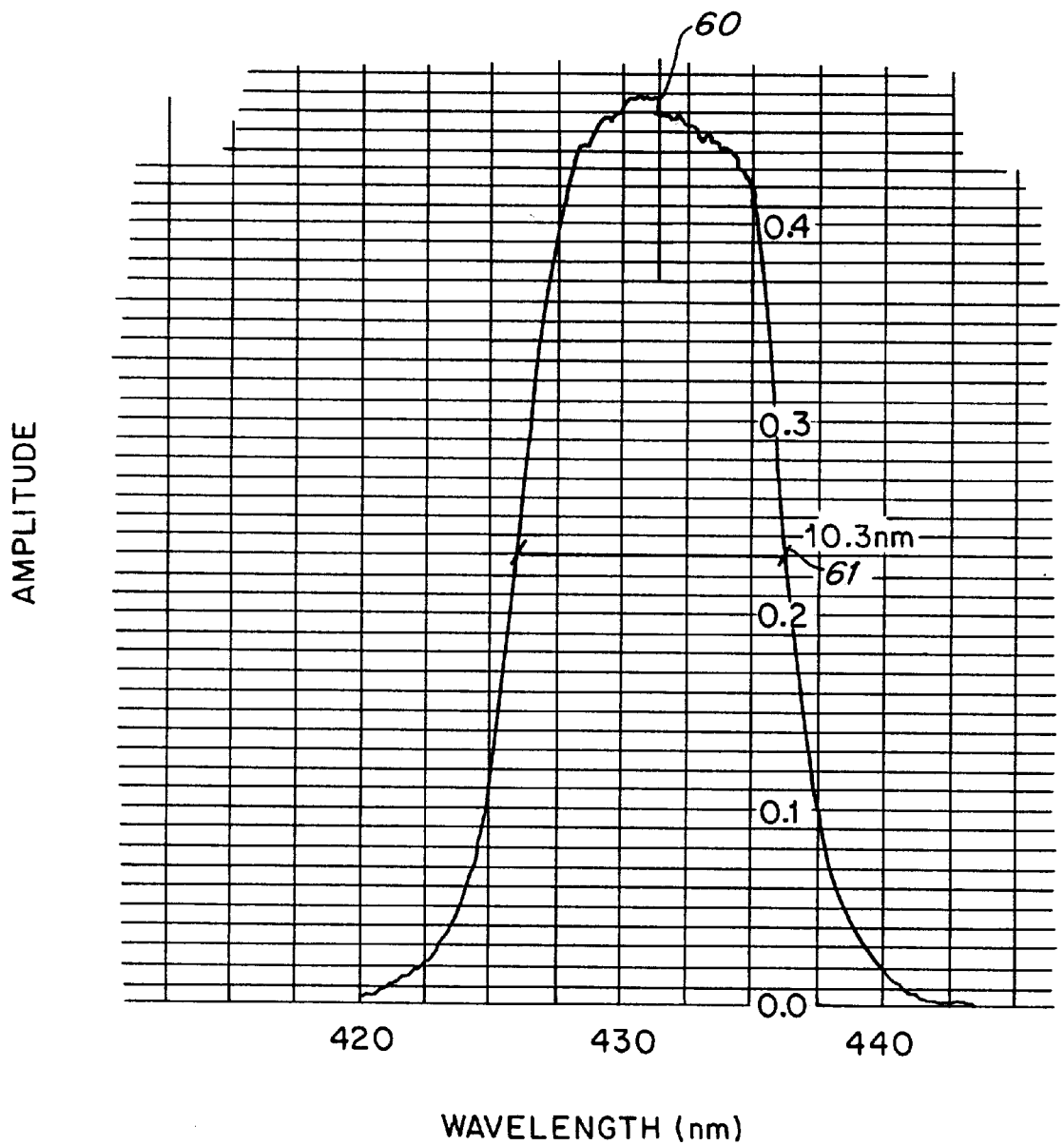
FIG. 7 is a frequency response graph of a filter that is a portion of one of the sensors of FIG. 2.

One sensor for measuring the CH band includes an optical filter positioned over a silicon detector. Generally, a silicon detector is responsive to wavelengths between 300 nm and 100 nm, so a silicon detector in combination with an optical filter will be responsive to a narrower band within the 300 nm–1100 nm band. FIG. 7 is a graph of the spectral response of one such optical filter, P/N 430F510-25, available from Andover Corporation of Salem N.H., USA. As shown in FIG. 7, the spectral response has a peak 60 at a wavelength of approximately 431 nm, and a half-peak bandwidth 61 of approximately 10.3 nm.

Figure 8:
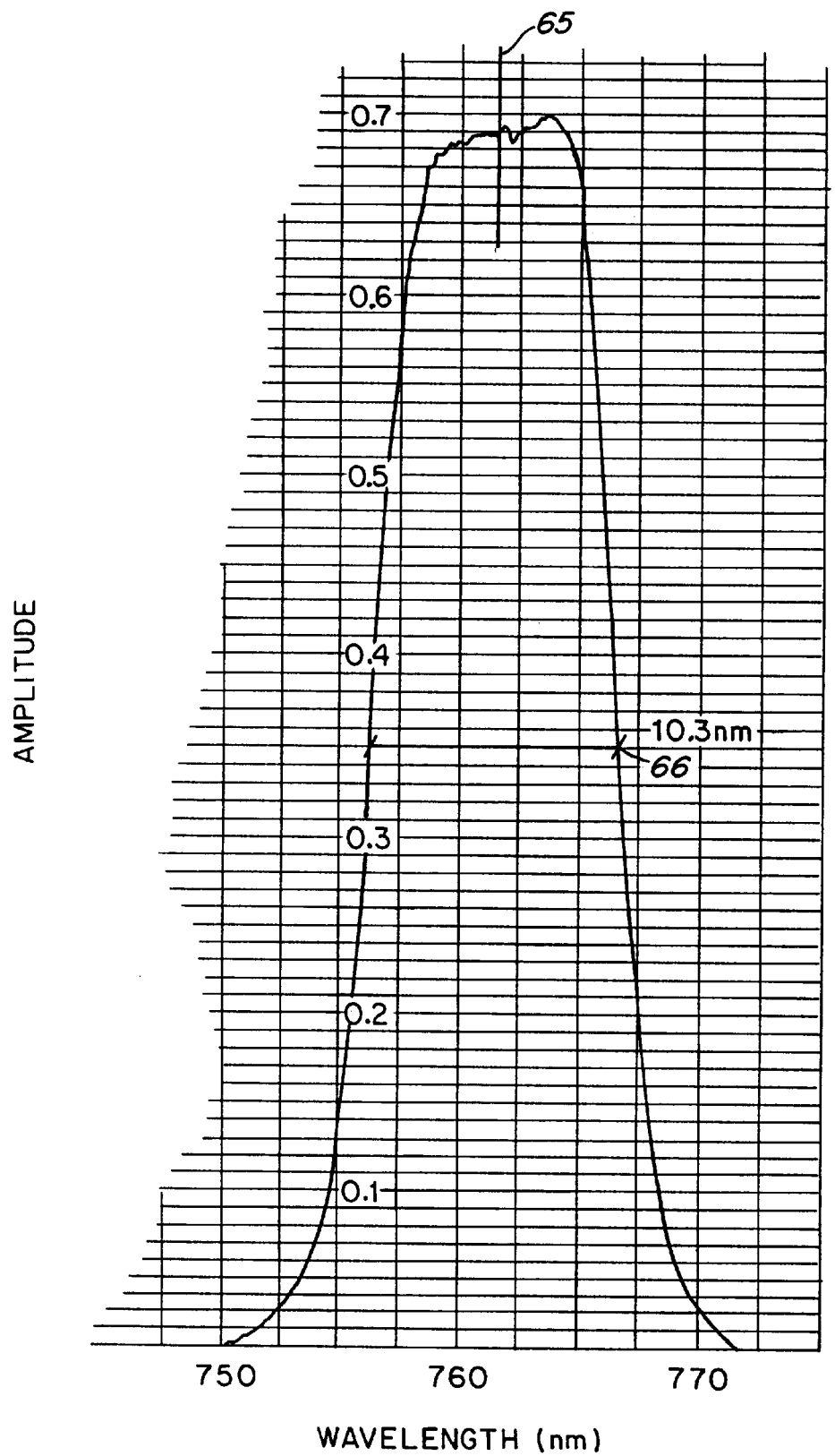
FIG. 8 is a frequency response graph of a filter that is a portion of one of the sensors of FIG. 2.

The $O_2$ band is centered about a wavelength of 760 nm, also generally considered to be within the visible spectrum. Generally, the amount of energy within the $O_2$ band is indicative of an efficient combustion process. In response to an increase in flame temperature, the amplitude of the $O_2$ band increases. As with the CH band, a sensor for detecting the $O_2$ band may include a silicon detector in combination with an optical filter which will be responsive to a narrower band within the 300 nm–1100 nm band. FIG. 8 is a graph of the spectral response of one such optical filter, P/N 760F510-25, available from Andover Corporation of Salem N.H., USA. As shown in FIG. 8, the spectral response has a peak 65 at a wavelength of approximately 762 nm, and a half-peak bandwidth 66 of approximately 10.3 nm.

The visible blackbody band has a range of approximately 550 nm to approximately 700 nm, although other ranges may be used with similar results. Such a spectrum generally has an amplitude that is indicative of yellow light, which in turn is indicative of an inefficient soot-producing flame. Thus, the amount of energy within the visible blackbody band is generally representative of an inefficient combustion process, because the visible blackbody band is representative of species such as $C_2$, CN, and NO. The energy within this band has high visible characteristics.

In response to an increase in flame temperature, the amplitude of the visible blackbody band often increases, but to a lesser degree than the amplitude representative of the species described above.

Accordingly, the amount of energy within each of the OH band, the CH band, and/or the $O_2$ band may be compared with the amount of energy within the blackbody band to determine a figure of merit relating to flame quality and flame temperature.

Additionally, an amplitude variation of the energy within the visible blackbody region may also be indicative of a flame characteristic. For example, if a flame is flickering yellow, such a situation is generally indicative of a state that is different from a state in which the flame is constant yellow. Both the variation in amplitude as well as the variation in frequency of such energy are processed in accordance with an embodiment of the invention.

Figure 9:
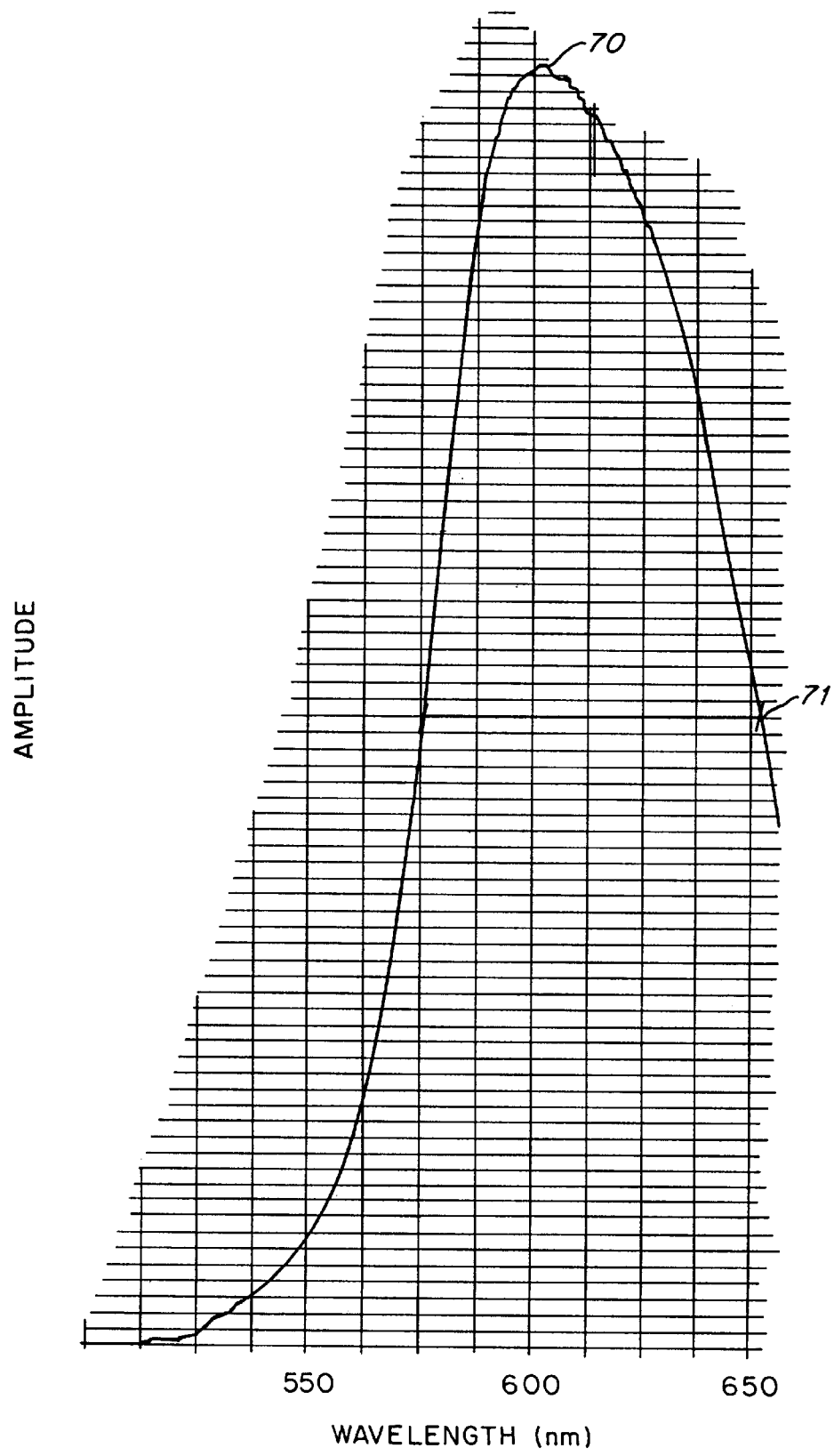
FIG. 9 is a frequency response graph of a filter that is a portion of one of the sensors of FIG. 2.

As with the OH band, a sensor for detecting the visible blackbody band may include a silicon detector in combination with an optical filter that will be responsive to a narrower band within the 300 nm–1100 nm band. FIG. 9 is a graph of the spectral response of one such optical filter, P/N 600S80-25, available from Andover Corporation of Salem N.H., USA. As shown in FIG. 9, the spectral response has a peak 70 at a wavelength of approximately 600 nm, and a half-peak bandwidth 71 of approximately 76 nm.

Figure 10:
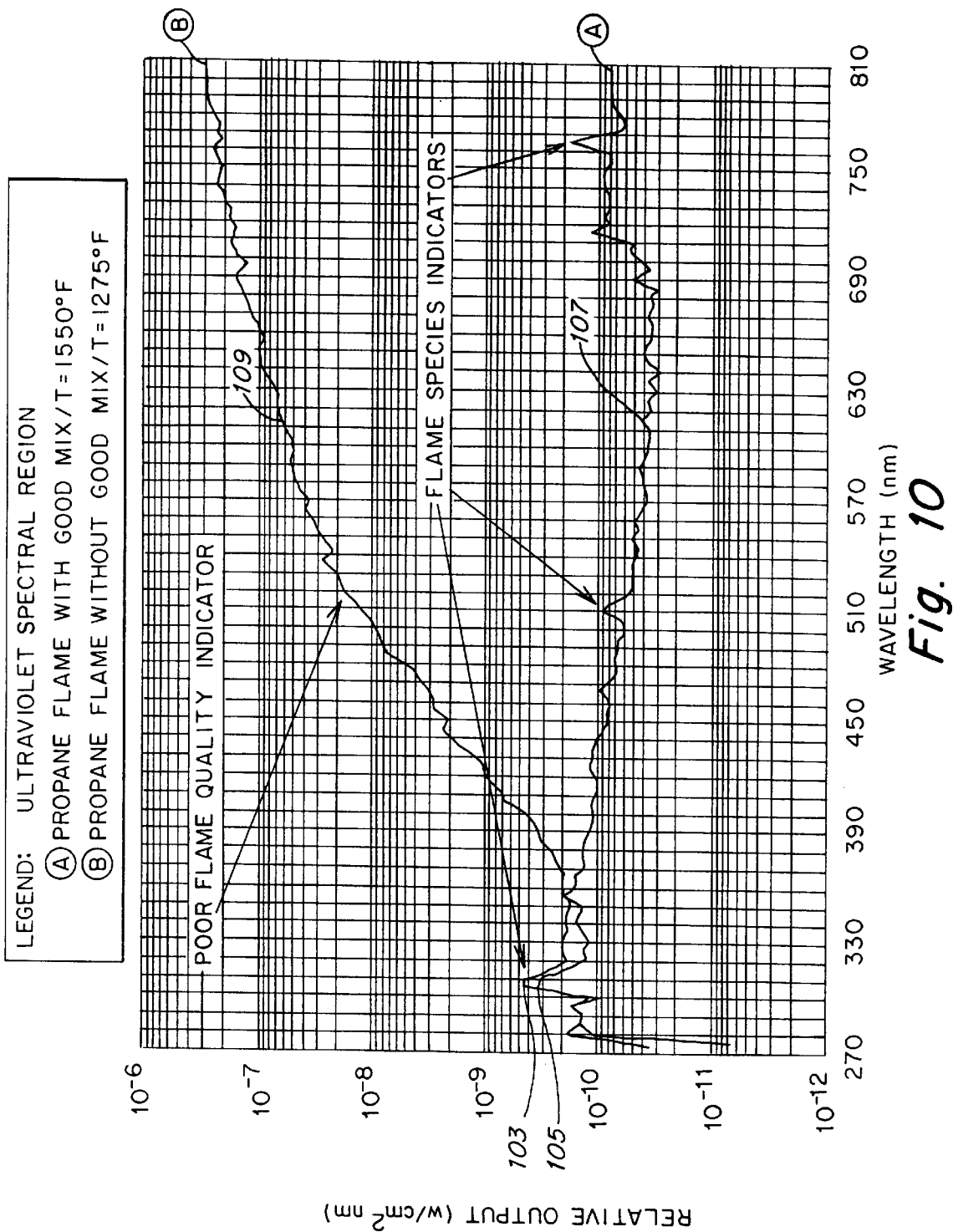
FIG. 10 is a frequency response graph showing the change in frequency response of a blackbody region and a species region in response to a change in flame temperature.

FIG. 10 depicts spectral data for OH and the visible blackbody region, each from two different flames, a higher temperature T1 flame at 1550 degrees Fahrenheit (° F.) as indicated by line A, and a cleaner burning lower temperature flame T2 at a temperature of 1275° F., as indicated by line B. As can be seen in FIG. 10, the ratio between the magnitude of the OH signal peak 103 for the T1 flame and the magnitude of the blackbody center wavelength 107 for the same T1 flame is approximately 10. In contrast, the ratio between the magnitude of the OH signal peak 105 for the T2 flame and the magnitude of the blackbody center wavelength 109 for the same T2 flame is approximately 0.01. Thus, a good example of a figure of merit for characterizing the quality of the combustion flame is the ratio of the OH signal peak magnitude to the visible blackbody signal magnitude, since a change in flame temperature of 1275° F. to 1550° F. results in a change of this figure of merit by a factor of 1000.

The IR spectral region also provides frequency bands relating to particular species or combination of species, as well as blackbody regions that may be used as references. The information derived from the IR spectral region can be processed in combination with or in addition to the information derived from the UV and VIS bands, in accordance with step 77 of FIG. 4, to facilitate efficient control of a turbine.

Several concepts of multi-spectrum detection relating to the IR spectral regions, including a discussion of sensing mechanisms and processing of the sensed for these regions, aspects of which are included in several embodiments of this invention, are disclosed in U.S. Pat. No. 5,612,676, issued Mar. 18, 1997 to Jonathan C. Plimpton and George L. Minott, entitled "DUAL CHANNEL MULTI-SPECTRUM INFRARED OPTICAL FIRE AND EXPLOSION DETECTION SYSTEM," which is hereby incorporated by reference in its entirety. Other concepts, processing, and sensing mechanisms relating to both the UV and IR regions, aspects of which are included in several embodiments of this invention, are also disclosed in U.S. Pat. No. 5,311,167, issued May 10, 1994 to Jonathan C. Plimpton and George L. Minott, entitled "UV/IR FIRE DETECTOR WITH DUAL WAVELENGTH SENSING IR CHANNEL," which is also hereby incorporated by reference in its entirety.

Figure 11:
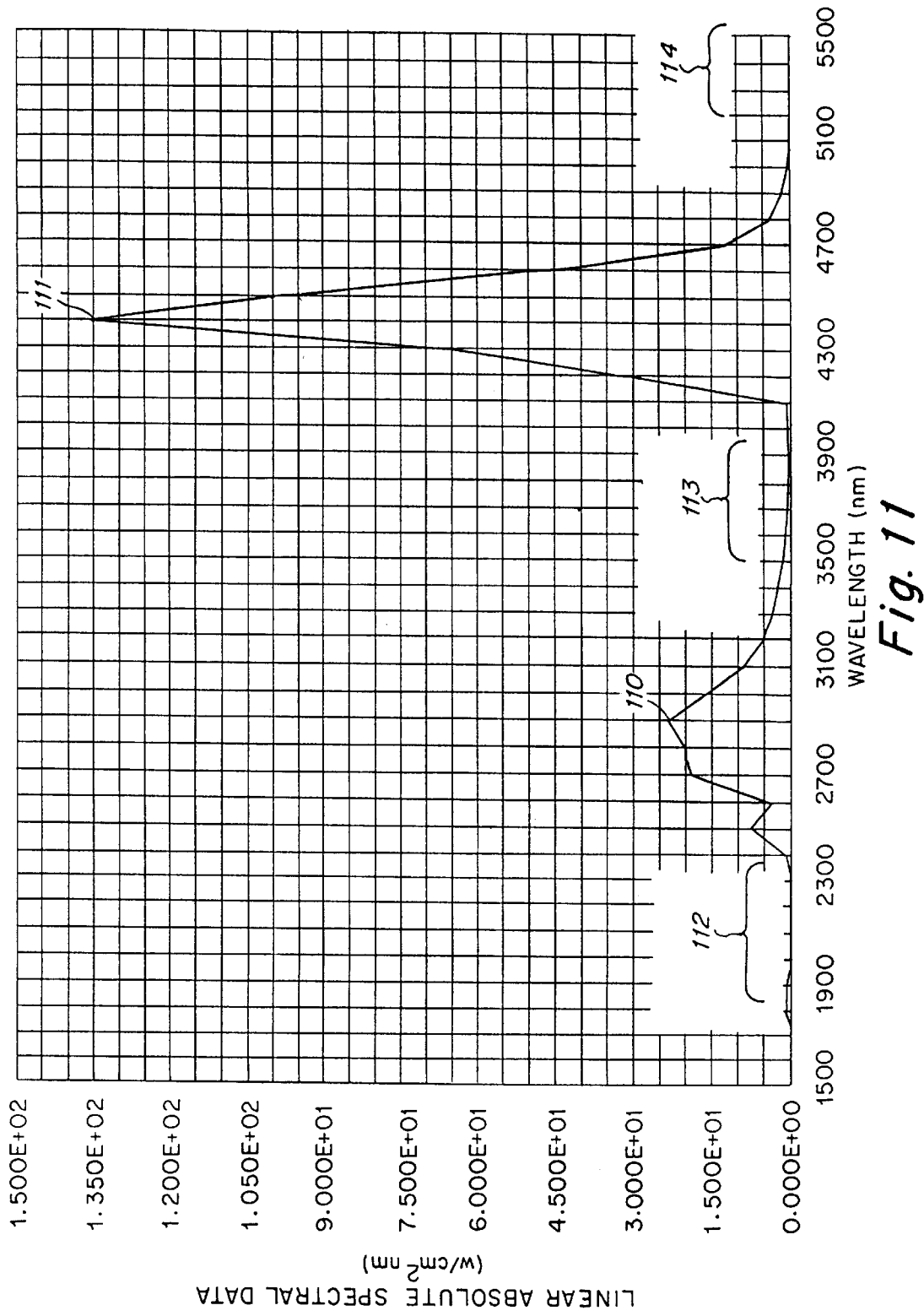
FIG. 11 is a graph showing infrared spectral data of a representative flame.

FIG. 11 depicts spectral data, generally within IR regions, measured from the flame of a bunsen burner at a distance of approximately four inches. As can be seen from FIG. 11, there are several peaks of energy, including a peak 110 at a wavelength of approximately 2.9 μm, typically indicative of the presence of $CO_2$ and $H_2O$, and a peak 111 at a wavelength of approximately 4.4 μm, typically indicative of the presence of $CO_2$. The energy bands represented by these two peaks are examples of regions that are representative of an efficient combustion process, and therefore may be sampled and processed in a manner similar to the described above with respect to the other species indicators.

Additionally, FIG. 11 depicts three blackbody regions, a first blackbody region 112 centered about a wavelength of approximately 2.2 μm, a second blackbody region 113 centered about a wavelength of approximately 3.7 μm, and a third blackbody region 114 centered about a wavelength of approximately 5.5 μm. These blackbody regions 113, 114, 115 are examples of IR regions that are representative of an inefficient combustion process, and therefore may be sampled and processed in a manner similar to the visible blackbody region discussed above.

The IR sensors 39 for detecting the amplitude of energy within the IR regions may be thermopile detectors, available from Meggitt Avionics Inc., 10 Ammon Drive, Manchester N.H., USA 03103. The thermopile detectors may be specified with respect to peak wavelength, bandwidth, and other characteristics to be implemented in accordance with several embodiments of the invention. Additionally, U.S. Pat. No. 5,612,676 also discloses such sensors in col. 15, lines 1–40.

Figure 12:
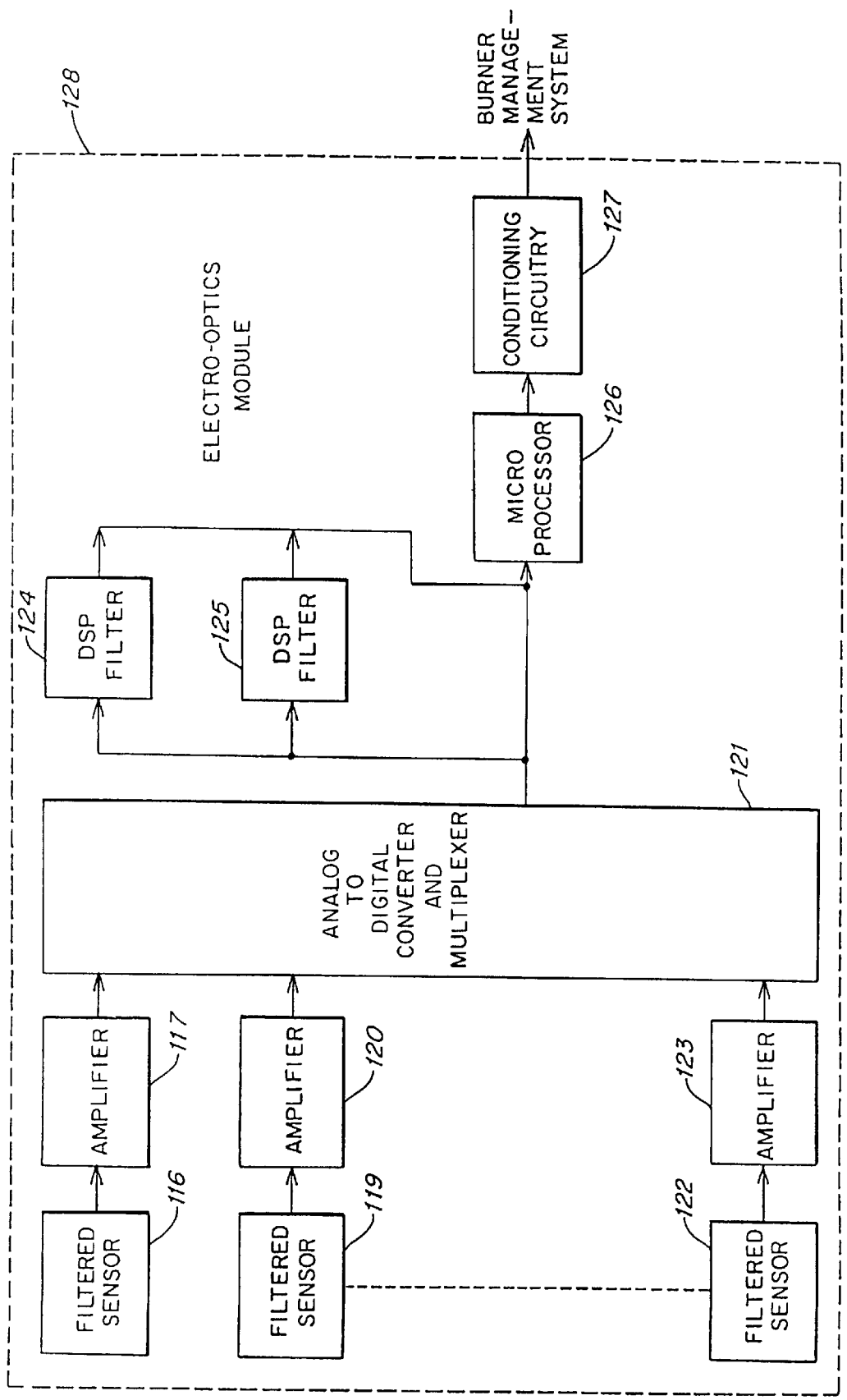
FIG. 12 is a more detailed block diagram of the flame characterizer of FIG. 2.

A more detailed block diagram of an embodiment of the combustion flame characterizer 30 is shown in FIG. 12. This embodiment, referred to as an electro-optics module 128, includes a first filtered sensor 116 coupled to an amplifier 117 which is further coupled to digital-to-analog (A/D) converter 121. The electro-optics module 128 also includes a second filtered sensor 119 coupled to an amplifier 120 that is further coupled to the A/D converter 121, and a third filtered sensor 122 coupled to an amplifier 123 that is further coupled to the A/D converter 121. As indicated in FIG. 12, the electro-optics module 128 may include many more such sensors and amplifiers configured similarly. The A/D converter 121 may also include a multiplexer for multiplexing the different analog signals from the amplifiers 117, 120, and 123, or such a multiplexer may be a distinct component. As known in the art, a plurality of A/D converters may also be implemented.

The A/D converter 121 is coupled to a microprocessor 126, which in turn is coupled to conditioning circuitry 127. Additionally, both a first DSP (digital signal processor) filter 124 and a second DSP filter 125 are coupled between the A/D converter 121 and the microprocessor 126.

In operation, each filtered sensor 116, 119, 122 senses a different spectral range within the burner under control. Each amplifier 117, 120, 123 amplifies the signal provided by the respective filtered sensor, to provide an analog signal that may be processed by the A/D converter 121. For example, the amplifier may linearly or non-linearly amplify the sensed signal to provide an analog signal in the most appropriate region in which the A/D converter 121 operates, as known in the art.

The A/D converter 121 provides a digital output representative of the analog signal presented by the appropriate amplifier. In some cases, the digital output is passed directly to the microprocessor 126, for example for immediate detection of an amplitude within a particular frequency band. In other cases, the digital output is passed to one of the DSP filters 124, 125, so that the selected DSP can perform filtering prior to passing digital data to the microprocessor 126. An example of DSP filtering includes processing a series of digital signals to extract the AC frequency and amplitude of the series of digital signals. Such filtering may be of particular use when determining the flame flicker based upon the signal representative of the visible blackbody region.

The conditioning circuitry 127 provides an output to the burner management system, for example the turbine controller 11. For example, the conditioning circuitry may provide data formatting that is specific to the particular burner management system to which the electro-optics module is coupled.

As discussed above, the electro-optics module 128 may be coupled directly to an optical port of a turbine combustion chamber 45. In one alternative of such an embodiment, the sensors 116, 119, and 122 are located close to the optical port, and the resulting analog signals are transmitted across analog signal wire to a control room that contains the digital processing elements such as D/A converter 121, DSP filters 124, 125, and microprocessors 126. In another alternative, the entire electro-optics module 128 may be located at the turbine.

Figure 13A:
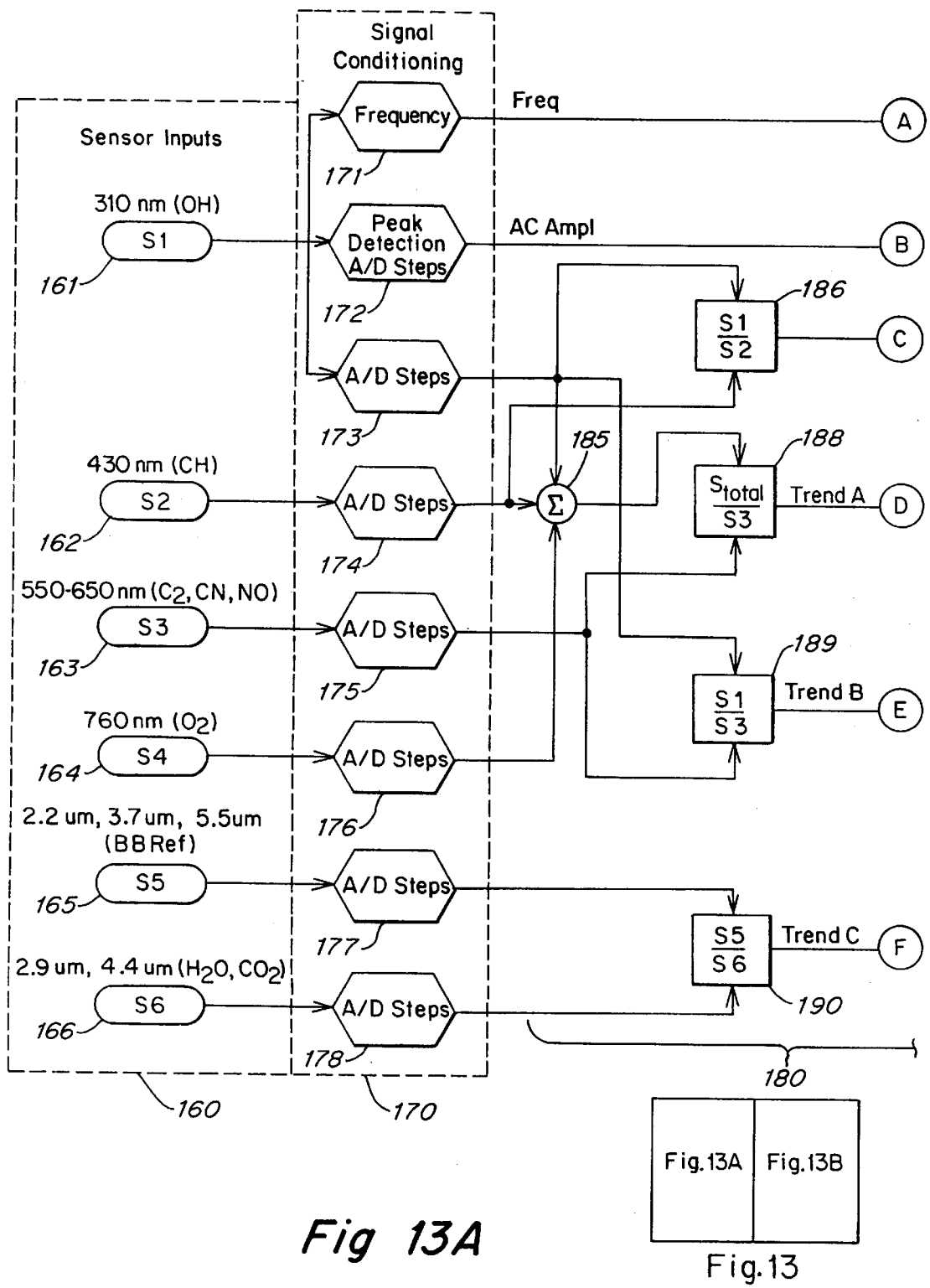
FIG. 13 is a signal flow and analysis diagram showing the process in accordance with an embodiment of the invention.
Figure 13B:
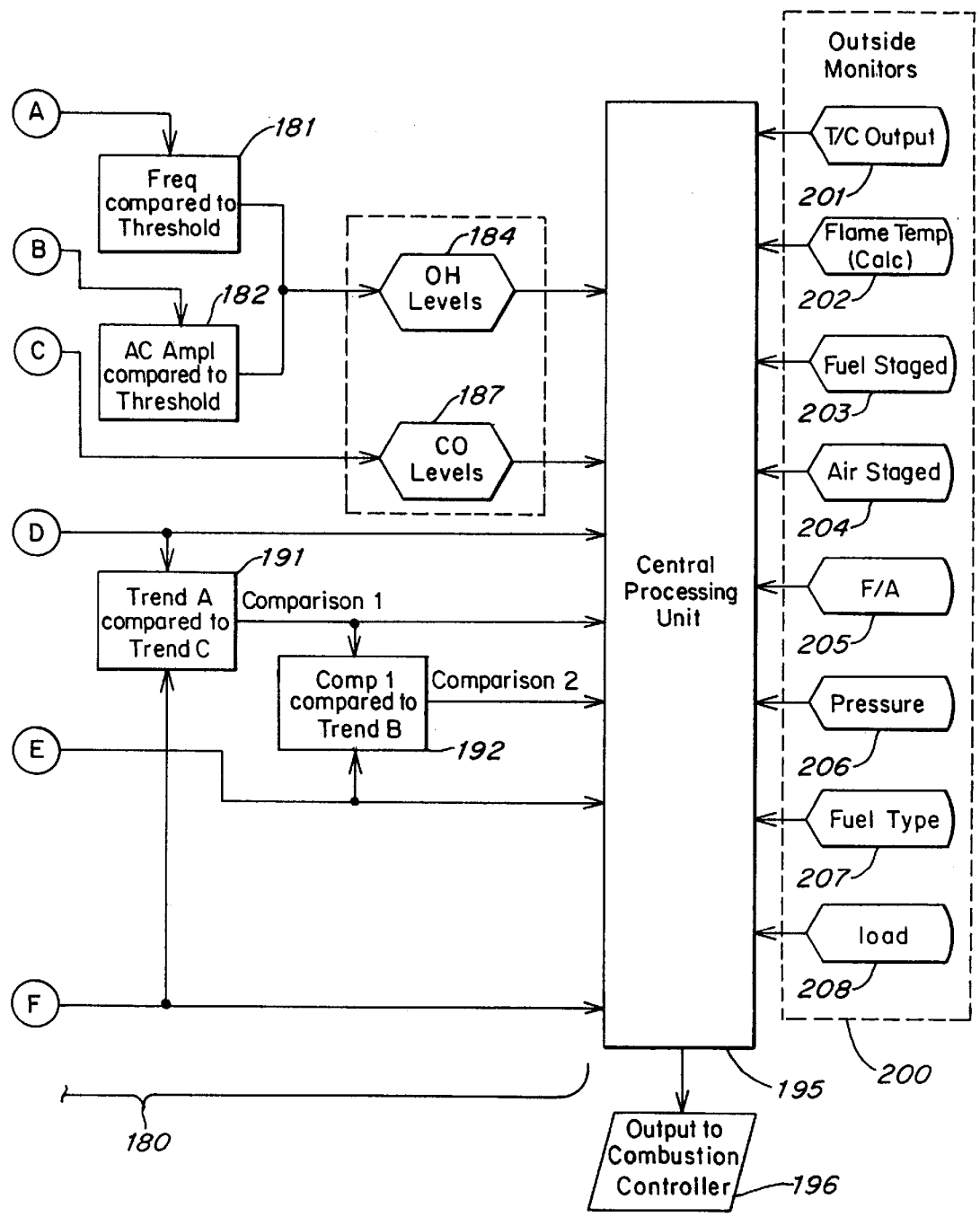

FIG. 13 is a signal flow and analysis diagram showing the process in accordance with an embodiment of the invention, for example the embodiment represented by the block diagram of FIG. 12. FIG. 13 also shows the several elements that provide input to or receive output from the process. In particular, FIG. 13 depicts sensor inputs 160 coupled to signal conditioning process 170. Process section 180 performs specific processing on the inputs received from signal conditioning process 170, and provides outputs to a central processing unit 195. Central processing unit 195 also receives inputs from outside monitors 200, and provides an output 196 to a combustion controller.

The sensor inputs shown in FIG. 13 includes measurement S1 161 for OH at a wavelength of 310 nm, a measurement S2 162 for CH at a wavelength of 430 nm, a measurement S3 163 for the visible blackbody region ($C_2$, CN, NO) at a wavelength spectrum from 550 nm–650 nm, a measurement S4 164 for $O_2$ at a wavelength of 760 nm, S5 165 of wavelengths of 2.2 $\mu$m, 3.7 $\mu$m, and 5.5 $\mu$m (representative of an IR blackbody region), and S6 166 for $CO_2$ and $H_2O$, and at wavelengths of 2.9 $\mu$m and 4.4 $\mu$m.

The signal conditioning 170 includes a frequency determination 171, peak detection 172, and A/D conversion 173, each of which is performed on measurement S1 161. The signal conditioning further includes AD conversions 174, 175, 176, 177, and 178, respectively performed on S2 through S6 (162–166). In at least one embodiment represented by FIG. 12, the outside monitors 200 include a T/C input 201, a calculated flame temperature 202, a fuel staged input 203, an air staged input 204, a F/A 205, a pressure input 206, a fuel type input 207, and a load input 208.

The T/C input 201 is indicative of thermocouple inputs and measurements of various probes associated with combustion control. The calculated flame temperature 202 is indicative of back calculated combustion flame temperature, typically derived from various thermocouple probes downstream from the combustion chamber. One example of such a calculated flame temperature is the exhaust gas temperature (EGT). The fuel staged input 203 includes measurements associated with various zones of injector ports within the combustion chamber. The air staged input 204 includes measurements associated with the air flow into the combustion chamber. The F/A 205 is a measurement of fuel to air ratio as determined by the staged fuel and air supply information. The pressure input 206 includes the pressure as measured within the combustion chamber resulting from the combustion process. The fuel type input 207 relates to the type of fuel being used, for example natural gas, fuel oil, and the like. Finally, the load input 208 indicates the requirements for production of electrical power as needed from the surrounding power grid.

In step 181 of the process 180, the frequency of measurement S1 161 (provided by frequency determination 171) is compared to a threshold, and an output is provided when this frequency exceeds a particular threshold. Additionally, in step 181, the AC amplitude of the measurement S1, (provided by peak detection and A/D conversion 172), is compared to a second threshold to yield an output when the AC amplitude exceeds the second threshold. The outputs of the steps 181 and 182 may be logically combined in step 184 to yield a determination of the OH level within the flame that is then provided to the central processing unit 195. This figure of merit is representative of flame stability.

In step 186, measurement S1 is divided by measurement S2, and the output of this step is provided to step 187, which in turn provides an indication of CO levels to the central processing unit 195. This figure of merit is representative of the amount of $CO_2$ generated in the combustion process.

In step 185, S1, S2, and S4 are combined to yield a sum (Stotal), which is then provided to step 188, which in turn divides the Stotal value by measurement S3 to determine trend A, which is provided to the central processing unit 195. This figure of merit is representative of flame quality as represented by the UV and visible signals, or the relative amount of soot and UHC produced during combustion.

In step 189, measurement S1 is divided by S3 to determine trend B, and in step 190 measurement S5 is divided by measurement S6 to determine trend C. Trend B is indicative of flame temperature, and trend C is indicative of flame quality as represented by the IR signals.

In step 191, the trend A is compared to trend C to yield comparison 1, which is provided to the central processing unit 195 as well as to step 192. In step 192, the comparison 1 is compared to trend B to yield comparison 2, also provided to the central processing unit 195. This figure of merit is representative of overall flame quality. This trend uses multiple frequencies generated by the combustion process to reduce the effects of combustion byproducts on signals in specific frequency regions. For example, water or oil will absorb UV energy but not IR energy, so water will reduce the amplitude of UV signals but not IR signals. By using multiple frequencies, the effects of water on the quality of the signals are reduced.

Figure 14:
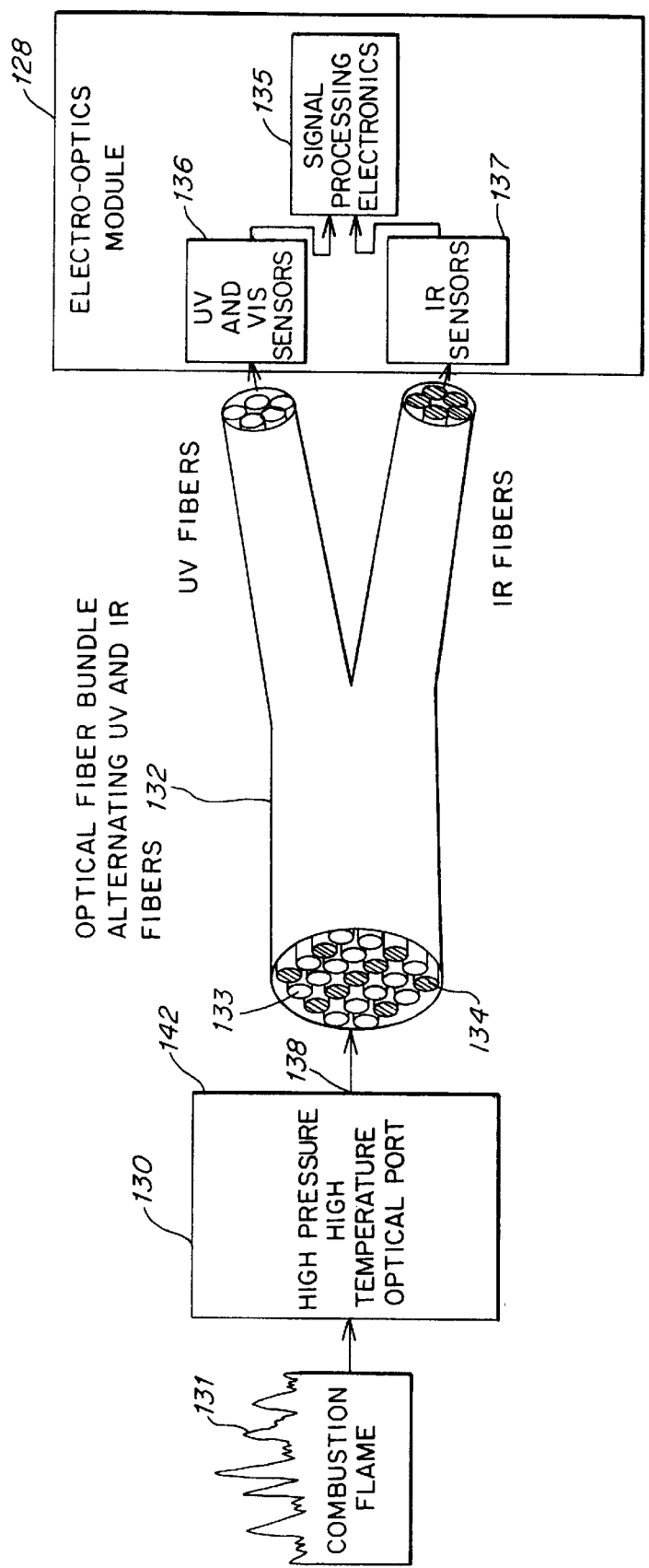
FIG. 14 is a schematic design of an embodiment of the invention in which the flame characterizer is located remotely from the turbine under control.

In another embodiment, depicted in FIG. 14, the electro-optics module 128 is coupled remotely from the optical port. In particular, FIG. 14 depicts a high pressure high temperature optical port 130 that is disposed to transfer UV, VIS, and IR emissions from the combustion flame 131. The high pressure high temperature optical port 130 may have a diameter of approximately ¼. An optical fiber bundle 132 is coupled to the electro-optics module 128. For the purpose of explaining details with respect to the optical fiber bundle 132, the sensors within the electro-optics module 128 are categorized as UV and VIS sensors 136, and IR sensors 137. Each of the sensors 136 and 137 may also include the appropriate filter, and is coupled to the signal processing electronics 135. In the embodiment shown in FIG. 12, the signal processing electronics 135 of FIG. 14 includes the A/D converter 121, the DSP filters 124, 125, the microprocessor 126, and the conditioning circuitry 127.

The optical fiber bundle 132 includes UV fibers 133 for passing frequency bands within the UV and VIS regions, and IR fibers 134 for passing frequency bands within the IR regions. More detail with respect to aspects of at least one embodiment of the fiber bundle 132, as well as other concepts relating to burner control, are disclosed in U.S. patent application Ser. No. 08/666,042, entitled FIBER OPTIC LINKED FLAME SENSOR, filed Jun. 19, 1996, with named inventors Jonathan C. Plimpton and George L. Minott, which is hereby incorporated by reference in its entirety.

The fiber bundle 132 allows the electro-optics module to be located at a distance from the combustion flame 131. Such a remote location may be advantageous due to the extreme environmental conditions that are often present near the combustion flame 131. In one embodiment, the UV and IR fibers are alternated within the bundle 132, so that the WV and IR spectra may be sensed across the entire optical port 130. In particular, in a typical optical port, the amplitude of the spectral energy is highest at a center 138 of the optical port 130, while such amplitude will decrease at the edges 142. Therefore, it may be advantageous to have some fibers such as fiber 141 that is disposed near the center 138 of the optical port 130, while other fibers such as fibers 139 and 140 are disposed closer to the edges 142 of the optical port 130.

Figure 15:
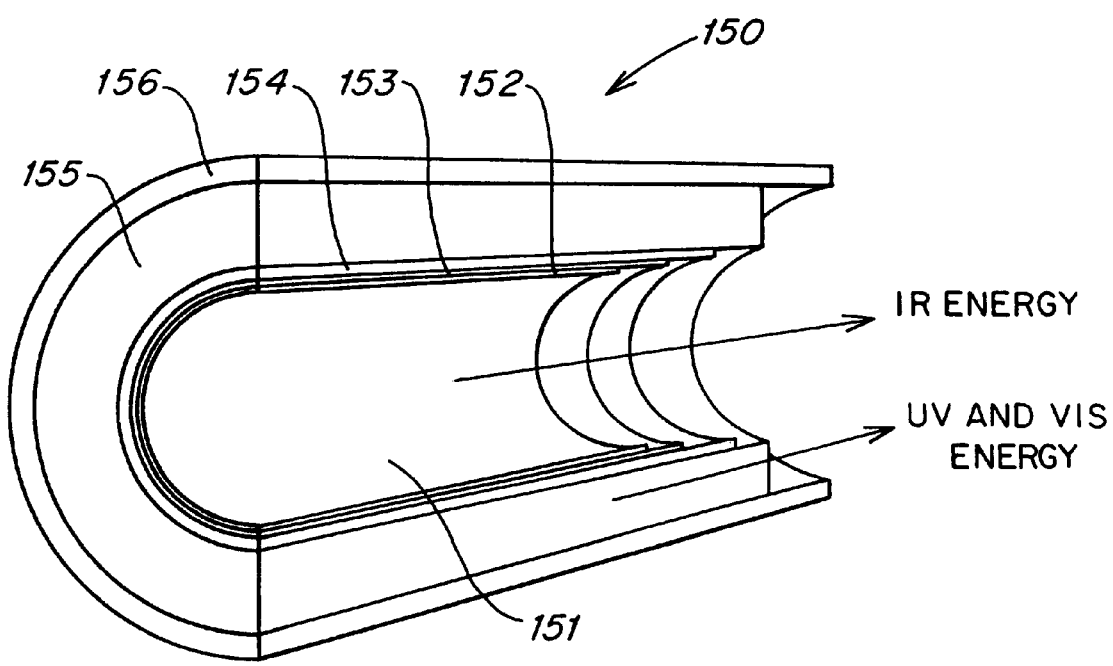
FIG. 15 is a cross section of a hollow fiber structure in accordance with an embodiment of the invention.

Additionally, multiple UV fibers and IR fibers within the fiber bundle 132 provides redundancy in the event that there is a failure within any one or more fibers FIG. 15 depicts another embodiment of the invention in which a single fiber arrangement provides a transmission path for energy within the UV, VIS, and IR spectra As discussed above with respect to FIG. 14, the amplitude of the spectral energy from the combustion flame 131 may vary according to the location on the optical port 130.

FIG. 15 discloses a cross section of a hollow fiber 150 which may be used in place of both the UV fibers 133 and the IR fibers 134. In particular, the hollow fiber 150 includes a metal dielectric layer 152 positioned about a hollow core 151. A metallic layer 153 surrounds the metal dielectric layer 152, which in turn is surrounded by a first structure of doped silica cladding 154. A fused silica core 155 surrounds the first structure of doped silica cladding 154, which in turn is surrounded by a second structure of doped silica cladding 156.

A more detailed discussion of hollow fiber optics is provided by James a. Harrington in "Crystalline and Hollow Infrared Fiber Optics," (Fiber Optic Materials Research Program, Rutgers University), which is hereby incorporated by reference in its entirety.

In operation, energy within both the UV and VIS spectra pass through the fused silica core 155. The two structures of doped silica cladding 154, 156 allow internal reflection of the UV and VIS energy so that the energy passes efficiently. In particular, the two structures of doped silica cladding 154, 156 have a higher index of refraction than the silica core 155, so that UV and VIS energy that approaches the edge of the silica core is reflected back into the silica core instead of passing through the edge.

However, fused silica does not pass IR energy as efficiently as a hollow core. Thus, in the embodiment shown in FIG. 15, a hollow core 151 is provided and surrounded by a metal dielectric layer 152, so that the IR energy will reflect off of the metal dielectric layer 152 and pass down the hollow core 151.

Thus, the metal dielectric layer (or wall) 152 has an internal face that defines the hollow core 151 of the fiber structure 150, so that the hollow core 151 passes infrared energy along the fiber structure 150. Additionally, a core of visible-transmissive material 155 surrounds the metal dielectric layer 152, so that the metal dielectric layer 152 passes passing visible energy along the fiber structure. The fiber structure 150 may be used to replace the entire fiber bundle 132, or may be used in combination with such a bundle 132.

In yet another embodiment of the invention, discussed briefly above, a fiber is disposed within a combustion chamber through the fuel path that leads to a particular fuel injector. Typically, such an arrangement would mean that the particular fuel injector would not be operational. However, in one example of such an embodiment, a turbine includes on the order of 20 fuel injectors, so that the loss of only one fuel injector is minimal to the overall fuel control algorithm. This loss in fuel control may in some cases be compensated by the gain in accuracy of flame characterization which is attainable from within the combustion chamber.

In one embodiment, a metallic sheeved optical fiber is fed down a fuel injector tube and a first end of the fiber is tack-welded to the fuel injector itself. The other end of the metallic sheeved optical fiber may be coupled directly to an electro-optics module 128. Alternatively, the other end of the metallic sheeved optical fiber may be coupled to a optical fiber bundle such as optical fiber bundle 132, or may be coupled to a fiber structure such as hollow fiber structure 150, either of which may be coupled to the electro-optics module 128. The metallic sheeved optical fiber may include a sapphire structure suitable for passing IR energy, and may also be gold-clad to improve durability in the presence of the extreme combustion chamber temperature. One example of such metallic sheeving is an INCONEL "610" tube, available from Uniform Tubes of Collegeville Pa.

When the sensing end of a fiber is disposed within the combustion chamber, such an arrangement increases the proximity to the combustion flame, may provide a better viewing angle into the combustion flame, and may result in a decrease in optical losses which otherwise may occur across the combustion chamber and through the optical port 130.

Having thus described several embodiments of the invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereto.

What is claimed is:

1. A system for characterizing a combustion flame in a combustion chamber, comprising:
   a first sensor having an input that receives energy within a first frequency band of the flame, and an output that provides a first signal indicative of an amplitude of the energy within the first frequency band;
   a second sensor having an input that receives energy within a second frequency band of the flame, different from the first frequency band, and an output that provides a second signal indicative of an amplitude of the energy within the second frequency band; and
   a flame characterization module having a first input coupled to the output of the first sensor, a second input coupled to the output of the second sensor, and an output that provides a figure of merit that characterizes the combustion flame as a function of at least a ratio of the first signal to the second signal;
   wherein the first frequency band is chosen to be a predetermined band characteristic of an efficient combustion process wherein an efficient combustion process is characterized by at least one of a minimized waste stream pollutant emission level and a maximized power output level per unit measure of fuel; and
   wherein the second frequency band is chosen to be a predetermined band characteristic of an inefficient combustion process wherein an inefficient combustion process is characterized by at least one of a high level of $NO_x$, a high level of $SO_x$, a high level of $CO_2$, a high level of unburned hydrocarbons, a high level of particulate matter, and a lower power output level per unit measure of fuel.

2. The system of claim 1, wherein the second frequency band includes a wavelength of 600 nm.

3. The system of claim 1, further comprising:
   a third sensor having an input that receives energy within a third frequency band of the flame within a visible region, and an output that provides a third signal indicative of an amplitude of the energy within the third frequency band; and
   a fourth sensor having an input that receives energy within a fourth frequency band of the flame within an ultraviolet region, and an output that provides a fourth signal indicative of an amplitude of the energy within the fourth frequency band;
   wherein the third and fourth frequency bands are chosen to be predetermined bands characteristic of an efficient combustion process;
   wherein the first frequency band is within an infrared region; and
   wherein the flame characterization module receives the third signal and the fourth signal, and the figure of merit further characterizes the combustion flame as a function of the third and fourth signals.

4. The system of claim 1, wherein the amplitude of energy of the first frequency band is indicative of a first characteristic of the combustion flame that increases in response to an increase in temperature.

5. The system of claim 4, wherein the amplitude of energy with the second frequency band is indicative of a second characteristic of the combustion flame representative of at least one of soot and unburned hydrocarbons.

6. The system of claim 1, in combination with a flame control system having an input that receives the figure of merit and an output that controls the combustion flame based upon the figure of merit.

7. The system of claim 1, further comprising a frequency variation module having an input that receives the first signal, and an output that provides a measure of a frequency of amplitude variation of the first signal, wherein the flame characterization module receives the measure of frequency, and the figure of merit further characterizes the combustion flame as a function of the measure of frequency.

8. The system of claim 1, further comprising an AC amplitude measurement module having an input that receives the first signal, and an output that provides a measure of an amount of AC amplitude variation of the first signal, wherein the flame characterization module receives the measure of AC amplitude variation, and the figure of merit further characterizes the combustion flame as a function of the measure of the amount of AC amplitude variation.

9. A method of characterizing a combustion flame in a combustion chamber, comprising:
   (a) measuring an amplitude of energy within a first frequency band of the flame, the first frequency band indicative of an efficient combustion process wherein an efficient combustion process is characterized by at least one of a minimized waste stream pollutant emission level and a maximized power output level per unit measure of fuel;
   (b) measuring an amplitude of energy within a second frequency band of the flame, the second frequency band indicative of an inefficient combustion process and different from the first frequency band, wherein an inefficient combustion process is characterized by at least one of a high level of $NO_x$, a high level of $SO_x$, a high level of $CO_2$, a high level of unburned hydrocarbons, a high level of particulate matter, and a lower power output level per unit measure of fuel; and
   (c) determining a figure of merit to characterize the combustion flame as a function of at least a ratio of the amplitude of energy within the first frequency band to the amplitude of energy within the second frequency band.

10. The method of claim 9, wherein the second band includes a wavelength of 600 nm.

11. The method of claim 9, further comprising:
    measuring an amplitude of energy within a third frequency band within a visible region of the flame, the third frequency band indicative of an efficient combustion process;
    measuring an amplitude of energy within a fourth frequency band within an ultraviolet region of the flame, the fourth frequency band indicative of an efficient combustion process;

wherein the first frequency band is within an infrared region; and wherein step (c) includes determining the figure of merit further as a function of the amplitude of energy within the third frequency band and the amplitude of energy within the fourth frequency band.

12. The method of claim 9, wherein the step (a) of measuring includes measuring at least one characteristic of the combustion flame that increases in response to an increase in a temperature.

13. The method of claim 9, wherein the step (b) of measuring includes measuring at least one characteristic of the combustion flame indicative of at least one of soot and unburned hydrocarbons.

14. The method of claim 9, further comprising a step of controlling the combustion flame based upon the figure of merit.

15. The method of claim 9, further comprising measuring a frequency of amplitude variation of the first signal, wherein step (c) includes determining the figure of merit further as a function of the frequency of amplitude variation of the first signal.

16. The method of claim 9, further comprising a step of measuring an amount of AC amplitude variation of the first signal, wherein step (c) includes determining the figure of merit further as a function of the amount of AC amplitude variation of the first signal.

17. An apparatus for characterizing a combustion flame in a combustion chamber, comprising:

first means for measuring an amplitude of energy within a first frequency band of the flame, the first frequency band indicative of an efficient combustion process wherein an efficient combustion process is characterized by at least one of a minimized waste stream pollutant emission level and a maximized power output level per unit measure of fuel;

second means for measuring an amplitude of energy within a second frequency band of the flame, the second frequency band indicative of an inefficient combustion process and different from the first frequency band, wherein an inefficient combustion process is characterized by at least one of a high level of $NO_x$, a high level of $SO_x$, a high level of $CO_2$, a high level of unburned hydrocarbons, a high level of particulate matter, and a lower power output level per unit measure of fuel; and third means for determining a figure of merit to characterize the combustion flame as a function of at least a ratio of the amplitude of energy within the first frequency band to the amplitude of energy within the second frequency band.

18. The apparatus of claim 17, wherein the second means include means for measuring an amplitude of energy within a second band that includes a wavelength of 600 nm.

19. The apparatus of claim 17, further comprising:

means for measuring an amplitude of energy within a third frequency band within a visible region of the flame, the third frequency band indicative of an efficient combustion process;

means for measuring an amplitude of energy within a fourth frequency band within an ultraviolet region of the flame, the fourth frequency band indicative of an efficient combustion process;

wherein the first frequency band is within an infrared region; and wherein the third means include means for determining the figure of merit further as a function of the amplitude of energy within the third frequency band and the amplitude of energy within the fourth frequency band.

20. The apparatus of claim 17, wherein the first means include means for measuring at least one characteristic of the combustion flame that increases in response to an increase in a temperature.

21. The apparatus of claim 20, wherein the second means include means for measuring at least one characteristic of the combustion flame indicative of at least one of soot and unburned hydrocarbons.

22. The apparatus of claim 17, fierier comprising means for controlling the combustion flame based upon the figure of merit.

23. The apparatus of claim 17, further comprising means for measuring a frequency of amplitude variation of the first signal, wherein the third means include means for determining the figure of merit further as a function of the frequency of amplitude variation of the first signal.

24. The apparatus of claim 17, further comprising means for measuring an amount of AC amplitude variation of the first signal, wherein the third means include means for determining the figure of merit further as a function of the amount of AC amplitude variation of the first signal.

* * * * *